US012398857B2

(12) United States Patent
Muramatsu

(10) Patent No.: US 12,398,857 B2
(45) Date of Patent: Aug. 26, 2025

(54) VEHICULAR LAMP

(71) Applicant: KOITO MANUFACTURING CO., LTD., Tokyo (JP)

(72) Inventor: Teppei Muramatsu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 36 days.

(21) Appl. No.: 18/576,446

(22) PCT Filed: Jul. 4, 2022

(86) PCT No.: PCT/JP2022/026639

§ 371 (c)(1),
(2) Date: Sep. 30, 2024

(87) PCT Pub. No.: WO2023/282238

PCT Pub. Date: Jan. 12, 2023

(65) Prior Publication Data

US 2025/0012422 A1 Jan. 9, 2025

(30) Foreign Application Priority Data

Jul. 7, 2021 (JP) ................................ 2021-113184
Jul. 7, 2021 (JP) ................................ 2021-113185

(51) Int. Cl.
*F21S 45/48* (2018.01)
*F21S 41/24* (2018.01)
*F21S 41/255* (2018.01)

(52) U.S. Cl.
CPC .............. *F21S 45/48* (2018.01); *F21S 41/24* (2018.01); *F21S 41/255* (2018.01)

(58) Field of Classification Search
CPC .......... F21S 41/143; F21S 41/24; F21S 45/47; F21S 45/48
See application file for complete search history.

(56) References Cited

U.S. PATENT DOCUMENTS 11,408,576 B2 * 8/2022 Zhu ...................... F21S 41/143
11,754,245 B1 * 9/2023 Lee ........................ F21S 43/14
362/511

(Continued)

FOREIGN PATENT DOCUMENTS

EP 2 604 910 A1 6/2013
EP 3115683 A1 1/2017

(Continued)

OTHER PUBLICATIONS

Extended European Search Report dated Jan. 22, 2025 from the European Patent Office in Application No. 22837653.9.

(Continued)

*Primary Examiner* — Eric T Eide
(74) *Attorney, Agent, or Firm* — Sughrue Mion, PLLC

(57) ABSTRACT

A vehicular lamp (100) includes a substrate (24), a light source (22*a*), a projection lens (30), and a light guidance body (40) having an incident surface (44*a*). A first space (201) is provided between a first region (441*b*) and the substrate (24), the first region (441*b*) including, on the incident surface (44*a*), a part of an outer peripheral edge of the incident surface (44*a*), and a second space (203) communicates with the first space (201) and is in contact with a second region (441*c*) including, on the incident surface (44*a*), the other part of the outer peripheral edge of the incident surface (44*a*). A width of the second space (203) is wider than a width of the first space (201) in an emission direction of the light from the light source (22*a*).

15 Claims, 10 Drawing Sheets

(56) References Cited

U.S. PATENT DOCUMENTS

| | | | | |
|---|---|---|---|---|
| 2010/0226142 | A1* | 9/2010 | Brendle | F21V 29/74 362/520 |
| 2012/0307501 | A1 | 12/2012 | Tankala et al. | |
| 2013/0114279 | A1 | 5/2013 | Marley | |
| 2013/0135856 | A1 | 5/2013 | Arai | |
| 2013/0322105 | A1* | 12/2013 | Uchida | F21S 41/151 362/517 |
| 2014/0321141 | A1* | 10/2014 | Bauer | F21S 41/321 362/235 |
| 2015/0103545 | A1* | 4/2015 | Kato | F21S 41/40 362/509 |
| 2017/0292671 | A1 | 10/2017 | Gousset-Rousseau | |
| 2019/0086050 | A1* | 3/2019 | Dikau | F21S 41/322 |
| 2021/0310628 | A1* | 10/2021 | Li | F21S 41/285 |

FOREIGN PATENT DOCUMENTS

| | | | |
|---|---|---|---|
| EP | 2 780 218 | B1 | 4/2018 |
| EP | 3 531 011 | A1 | 8/2019 |
| JP | 2012-164626 | A | 8/2012 |
| JP | 2016-219723 | A | 12/2016 |
| JP | 2017-199660 | A | 11/2017 |
| JP | 2021-012907 | A | 2/2021 |
| KR | 10-2019-0080506 | A | 7/2019 |
| WO | 2020/227827 | A1 | 11/2020 |

OTHER PUBLICATIONS

International Search Report for PCT/JP2022/026639 dated Aug. 30, 2022 (PCT/ISA/210).

Partial Supplementary European Search Report dated Oct. 7, 2024 in European Patent Application No. 22837653.9.

* cited by examiner

VEHICULAR LAMP

CROSS REFERENCE TO RELATED APPLICATIONS

This application is a National Stage of International Application No. PCT/JP2022/026639 filed Jul. 4, 2022, claiming priorities based on Japanese Patent Application No. 2021-113184 filed Jul. 7, 2021 and on Japanese Patent Application No. 2021-113185 filed Jul. 7, 2021.

TECHNICAL FIELD

The present invention relates to a vehicular lamp.

BACKGROUND ART

A vehicular lamp that emits light from a light source forwards through a projection lens is known, and Patent Literatures 1 and 2 disclose such a vehicular lamp. A vehicular lamp disclosed in Patent Literature 1 includes a light guidance body disposed between a light source and a projection lens. Light emitted from the light source is incident on the light guidance body, and the light guidance body emits the light toward the projection lens.

A vehicular lamp disclosed in Patent Literature 2 includes a light source, a substrate having the light source mounted on the front surface thereof, and a heat sink including a base plate disposed on the back surface of the substrate and a plurality of heat radiation fins disposed in parallel on the base plate. Heat generated by driving the light source and supplied from the light source is transferred to the base plate through the substrate, and each of the heat radiation fins radiates the heat.

[Patent Literature 1] JP 2017-199660 A

[Patent Literature 2] JP 2021-012907 A

SUMMARY OF INVENTION

A vehicular lamp according to a first aspect of the present invention includes: a substrate; a light source mounted on the substrate; a projection lens disposed in front of the light source; and a light guidance body having an incident surface on which light from the light source is incident, the light guidance body being disposed between the light source and the projection lens and emitting the light toward the projection lens. A first space and a second space are provided on a side closer to the light source than to the incident surface, in which the first space is provided between a first region and the substrate, the first region including, on the incident surface, a part of an outer peripheral edge of the incident surface, and the second space communicates with the first space and is in contact with a second region including, on the incident surface, the other part of the outer peripheral edge of the incident surface. A width of the second space is wider than a width of the first space in an emission direction of the light from the light source.

In the vehicular lamp according to the first aspect, since the width of the second space is wider than the width of the first space, gas can easily flow through the second space as compared with a case in which the width of the second space is the same as the width of the first space. When the gas easily flows, heat is hardly accumulated between the light source and the incident surface and, as such, deformation of the light guidance body due to heat can be suppressed. When the deformation is suppressed, the light traveling inside the light guidance body and the light traveling from the light guidance body to the projection lens can be suppressed from traveling in an unintended direction, thereby making it possible to suppress a change in a light distribution pattern to an unintended shape.

Further, in the vehicular lamp according to the first aspect, the substrate may not be disposed on a side opposite to the second region with the second space interposed between the side and the second region.

In addition, the vehicular lamp according to the first aspect may further include a heat sink including a base plate disposed on a back surface of the substrate, in which the base plate may include a non-overlapping part that does not overlap the substrate, and the second space may be provided between the second region of the incident surface and the non-overlapping part.

According to this configuration, heat between the light source and the incident surface is more easily transferred from the second space to the base plate in contact with the second space than a case in which the second space is not in contact with the base plate. Therefore, deformation of the light guidance body due to heat can be suppressed in the second region.

Further, in the vehicular lamp according to the first aspect, the substrate may include a main body part including a region facing the first region of the incident surface, and an extension part facing the second region of the incident surface and being thinner than the main body part, and the second space may be provided between the second region of the incident surface and the extension part.

According to this configuration, the substrate can be widened as compared with a case in which the extension part is not provided.

In addition, when the substrate is viewed from the front, a boundary between the first space and the second space may overlap a recessed part provided in the incident surface.

Further, in the vehicular lamp according to the first aspect, the substrate may be disposed non-horizontally, and the second space may be provided above the first space.

Gas warmed by the heat between the light source and the incident surface rises. When the second space is provided above the first space, the warmed gas flows from the first space to the second space, the width of which is wider than that of the first space. In this case, the gas can easily flow as compared with a case in which the first space, the width of which is narrower than that of the second space, is provided above the second space, thereby making it possible to suppress heat from being accumulated between the light source and the incident surface in natural air cooling.

The vehicular lamp according to the first aspect may further include a heat sink including a base plate disposed on a back surface of the substrate and a plurality of heat radiation fins disposed in parallel with an interval therebetween on a surface of the base plate, in which the surface is located on a side opposite to a side facing the substrate. The substrate may be made of metal, and the heat sink may be provided with a third space in contact with an exposed region, the base plate, and the heat radiation fins adjacent to each other, in which the exposed region is exposed from the base plate in at least a part of the back surface, in which the part is located between the heat radiation fins adjacent to each other.

In the vehicular lamp, the substrate is made of metal, and the thermal conductivity of metal is higher than the thermal conductivity of resin as compared with a case in which the substrate is made of resin, so that the heat from the light source can be easily transferred to the base plate via the substrate. Since the heat transferred to the base plate is radiated from the heat radiation fin, the substrate can be easily cooled. In addition, in the vehicular lamp, since the exposed region is in contact with the third space, heat is also directly radiated from the exposed region which is a part of the metal substrate. In this case, the substrate can be easily cooled as compared with a case in which heat is not directly radiated from the substrate. When the substrate is cooled in this manner, the heat from the light source can be easily transferred to the substrate and, as such, cooling efficiency of the light source can be improved.

In the vehicular lamp according to the first aspect, the third space may merge with the second space.

In this configuration, when gas flows from the third space to the second space and the gas flowing through the third space is faster than the gas flowing through the second space, the gas flowing through the second space is drawn by the gas merging with the second space from the third space and the speed of the gas flowing through the second space increases. Therefore, the light guidance body can be cooled. Conversely, when the gas flowing through the second space is faster than the gas flowing through the third space, the gas flowing through the third space is drawn by the gas flowing through the second space, and the speed of the gas flowing through the third space increases. Therefore, the heat sink can be cooled.

Further, in the vehicular lamp according to the first aspect, at least a part of the third space may overlap the light source when the substrate is viewed from the front.

In this case, as compared with a case in which the third space does not overlap the light source, the heat from the light source can be easily transferred to the gas flowing through the third space via the substrate.

A vehicular lamp according to a second aspect of the present invention includes: a metal substrate; a light source mounted on a front surface of the substrate; and a heat sink disposed on a back surface of the substrate. The heat sink includes a base plate disposed on the back surface, and a plurality of heat radiation fins disposed in parallel with an interval therebetween on a surface of the base plate, in which the surface is located on a side opposite to a side facing the substrate. The heat sink is provided with a heat sink side space in contact with an exposed region, the base plate, and the heat radiation fins adjacent to each other, in which the exposed region is exposed from the base plate in at least a part of the back surface, in which the part is located between the heat radiation fins adjacent to each other.

In the vehicular lamp according to the second aspect, the substrate is made of metal. In this case, since the thermal conductivity of metal is higher than the thermal conductivity of resin as compared with a case in which the substrate is made of resin, heat from the light source can be easily transferred to the base plate via the substrate. Since the heat transferred to the base plate is radiated from the heat radiation fin, the substrate can be easily cooled. In addition, in the vehicular lamp, since the exposed region is in contact with the heat sink side space, heat is also directly radiated from the exposed region which is a part of the metal substrate. In this case, the substrate can be easily cooled as compared with a case in which heat is not directly radiated from the substrate. When the substrate is cooled in this manner, the heat from the light source can be easily transferred to the substrate and, as such, cooling efficiency of the light source can be improved.

Further, in the vehicular lamp according to the second aspect, the heat sink side space may overlap at least a part of the light source when the substrate is viewed from the front.

According to this configuration, as compared with a case in which the heat sink side space does not overlap the light source, a region of the substrate, the region overlapping the light source, can be easily cooled by gas flowing through the heat sink side space. When the region is cooled, cooling efficiency of the light source can be improved.

Further, in the vehicular lamp according to the second aspect, a width of the heat sink side space may be wider than a width of the light source when the substrate is viewed from the front.

According to this configuration, when the width of the heat sink side space is widened, the width of the exposed region is widened, heat is easily transferred from the exposed region to the heat sink side space, and the substrate is easily cooled. Further, when the width of the heat sink side space is widened, gas can easily flow through the heat sink side space. When the gas easily flows, heat is hardly accumulated in the heat sink side space and, as such, the substrate is easily cooled. When the substrate is cooled in this manner, cooling efficiency of the light source can be improved. Furthermore, in this configuration, a region of the substrate around the light source can be cooled, and when the region is cooled, the heat from the light source is diffused to the region, so that the cooling efficiency of the light source can be further improved.

Further, in the vehicular lamp according to the second aspect, the base plate may include a plurality of base plate pieces disposed side by side with an interval therebetween on the back surface, the heat radiation fin may be disposed on each of the base plate pieces adjacent to each other, and the exposed region may be exposed between the base plate pieces adjacent to each other.

In the vehicular lamp according to the second aspect, the heat radiation fins, each of which is provided in a corresponding one of the base plate pieces adjacent to each other, may be connected to each other.

According to this configuration, the base plate pieces adjacent to each other via the heat radiation fins connected to each other are formed as one unit. In this case, the number of attachment steps of the heat sink can be reduced as compared with a case in which the heat radiation fins are not connected to each other.

The vehicular lamp according to the second aspect may further include a light guidance body having an incident surface on which light from the light source is incident, in which the light guidance body is disposed in front of the light source and guides the light. The heat sink side space may overlap at least a part of the incident surface when the substrate is viewed from the front.

As described above, when the substrate is cooled, the heat from the light source is easily transferred to the substrate. Therefore, when the heat sink side space overlaps at least a part of the incident surface, heat from the light source is less likely to be transferred to the incident surface and, as such, heat is less likely to be accumulated between the light source and the incident surface, as compared with a case in which the heat sink side space does not overlap the incident surface. As a result, deformation of the light guidance body including the incident surface due to the heat can be suppressed. When the deformation of the light guidance body is suppressed, the light traveling inside the light guidance body and the light emitted from the light guidance body can be suppressed from traveling in an unintended direction, thereby making it possible to suppress a change in a light distribution pattern to an unintended shape.

In the vehicular lamp according to the second aspect, the base plate may include a non-overlapping part that does not overlap the substrate and an overlapping part that overlaps the substrate, and the heat sink side space may extend to an edge of the substrate, in which the edge overlaps a boundary between the non-overlapping part and the overlapping part when the substrate is viewed from the front.

When the heat sink side space extends in this manner, the heat sink side space is opened on the non-overlapping part side. When the gas flowing through the heat sink side space and the gas flowing between the light source and the incident surface merge via the opening of the heat sink side space, and the gas flowing through the heat sink side space is faster than the gas flowing between the light source and the incident surface, the gas flowing between the light source and the incident surface is drawn by the gas flowing through the heat sink side space, and the speed of the gas flowing between the light source and the incident surface increases. Therefore, the light guidance body can be cooled. Conversely, when the gas flowing between the light source and the incident surface is faster than the gas flowing through the heat sink side space, the gas flowing through the heat sink side space is drawn by the gas flowing between the light source and the incident surface, and the speed of the gas flowing through the heat sink side space increases. Therefore, the heat sink can be cooled.

DESCRIPTION OF EMBODIMENTS

Figure 1:
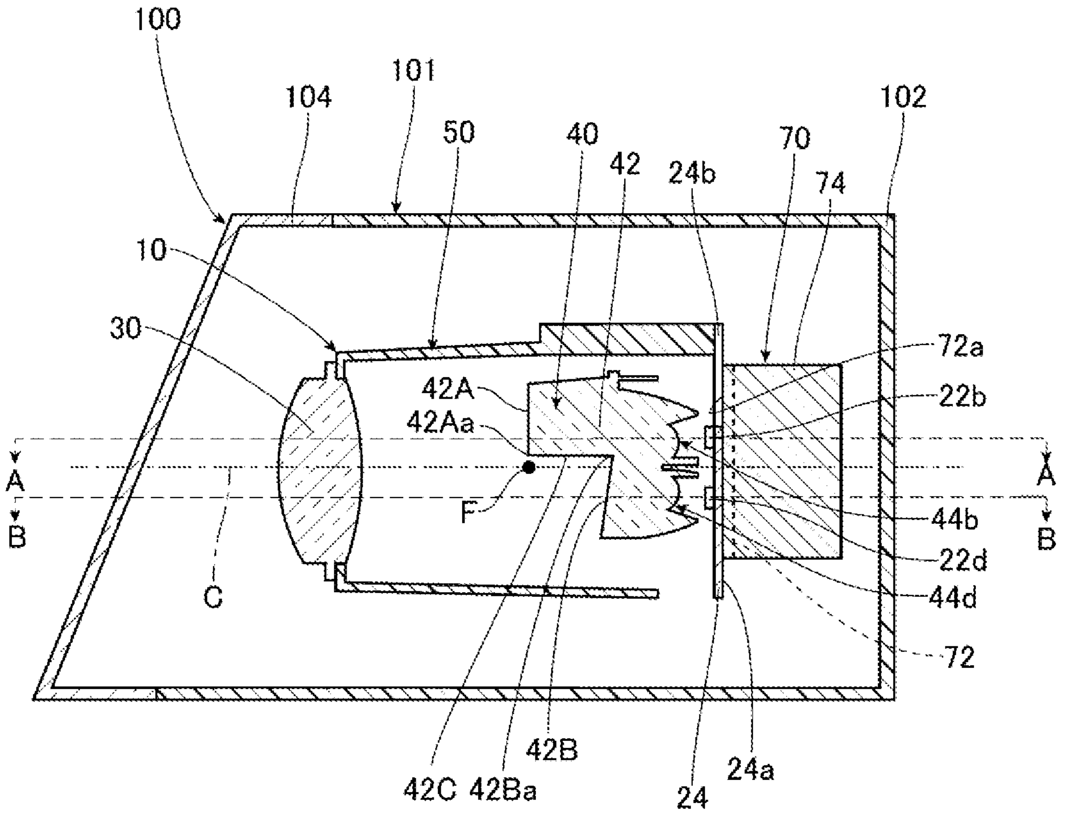
FIG. 1 is a cross-sectional view illustrating a schematic configuration example of a vehicular lamp according to a first embodiment of the present invention.

Hereinafter, a preferred embodiment of a vehicular lamp according to the present invention will be described in detail with reference to the drawings. The embodiments exemplified below are intended to facilitate understanding of the present invention and are not intended to limit the present invention. The present invention can be modified and improved without departing from the gist thereof. In addition, in the present invention, components described in the following exemplary embodiments may be appropriately combined. It is noted that, in the drawings referred to below, dimensions of each member may be changed for easy understanding.

First Embodiment

Figure 2:
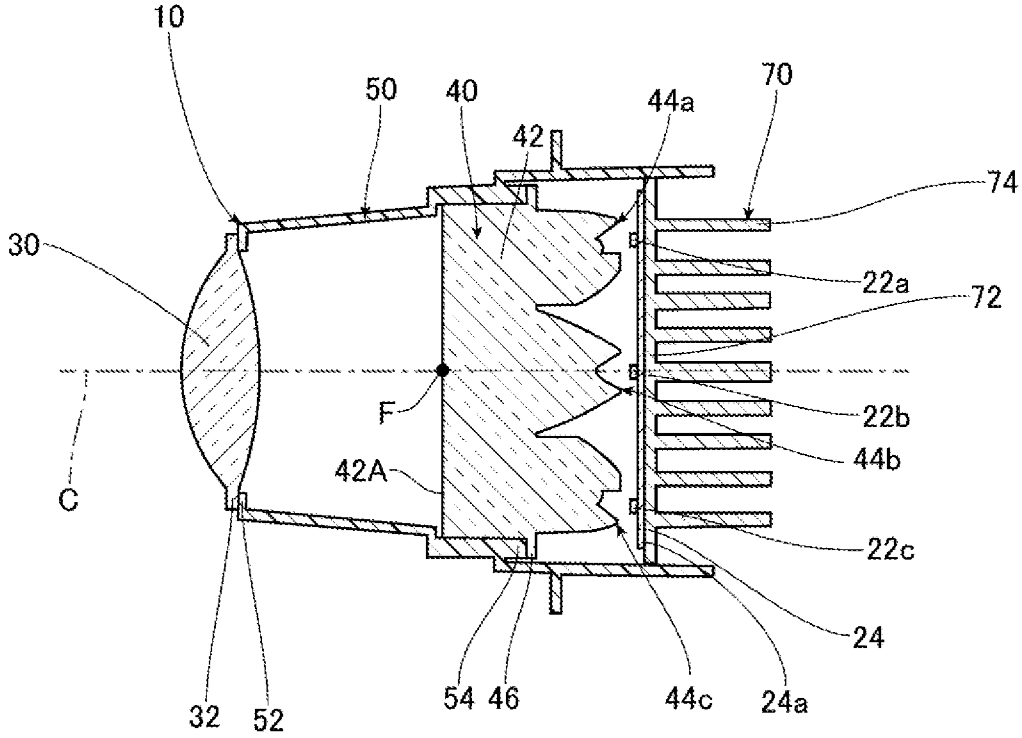
FIG. 2 is a cross-sectional view taken along line A-A illustrated in FIG. 1.
Figure 3:
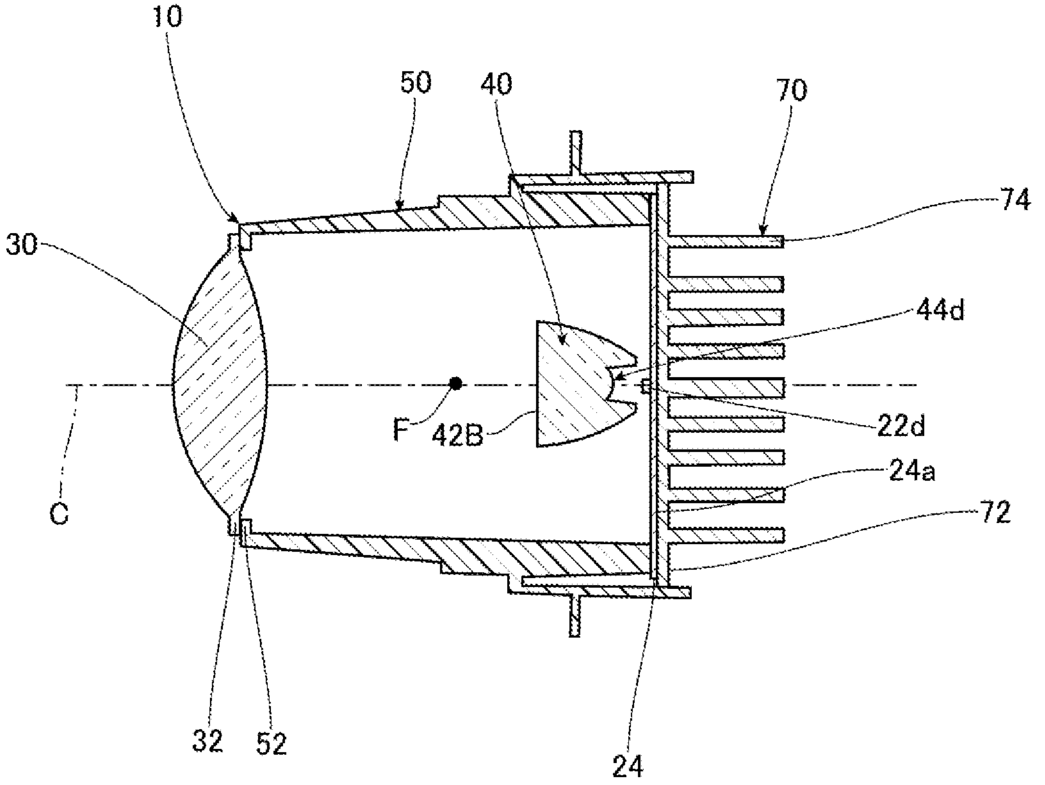
FIG. 3 is a cross-sectional view taken along line B-B illustrated in FIG. 1.

A first embodiment of the present invention will be described. FIG. 1 is a cross-sectional view illustrating a schematic configuration example of a vehicular lamp of the present embodiment. FIG. 2 is a cross-sectional view taken along line A-A illustrated in FIG. 1, and FIG. 3 is a cross-sectional view taken along line B-B illustrated in FIG. 1.

A vehicular lamp 100 is used as a headlight provided at a front end portion of a vehicle. The headlight is generally provided in each of the left and right directions on the front of the vehicle. In the present specification, "right" means the right side in the traveling direction of the vehicle, and "left" means the left side in the traveling direction of the vehicle. Each of the left and right headlights has the same configuration except that the shape is substantially symmetrical in the left-and-right direction. Therefore, in the present embodiment, one headlight will be described.

The vehicular lamp 100 of the present embodiment mainly includes a housing 101 and a projector type lamp unit 10 housed in the housing 101. The housing 101 includes a lamp body 102 made of resin and a translucent cover 104 through which light from the lamp unit 10 passes. The translucent cover 104 is fixed to the lamp body 102 so as to close a front opening of the lamp body 102. The lamp unit 10 is accommodated in a lamp chamber formed by the lamp body 102 and the translucent cover 104 in a state in which the optical axis thereof is adjusted such that the forward-and-rearward direction of the lamp unit 10 substantially coincides with the forward-and-rearward direction of the vehicle. It is noted that, in FIGS. 2 and 3, illustration of the housing 101 is omitted.

The lamp unit 10 mainly includes light sources **22*a*, 22*b*, 22*c*, and 22*d*, a common substrate 24 having the light sources 22*a*, 22*b*, 22*c*, and 22*d* mounted on the front surface thereof, a light guidance body 40, a projection lens 30, and a heat sink 70. The lamp unit 10 emits light from the light sources 22*a*, 22*b*, 22*c*, and 22*d* toward the front of the lamp unit 10 via the light guidance body 40 and the projection lens 30**.

The substrate 24 is made of metal, and an example of the metal includes aluminum. The substrate 24 is supported by a lens holder 50 in a state of being disposed so as to extend along a vertical plane orthogonal to an optical axis C of the projection lens 30. The optical axis C is an axis extending in the forward-and-rearward direction of the lamp unit 10.

Figure 4:
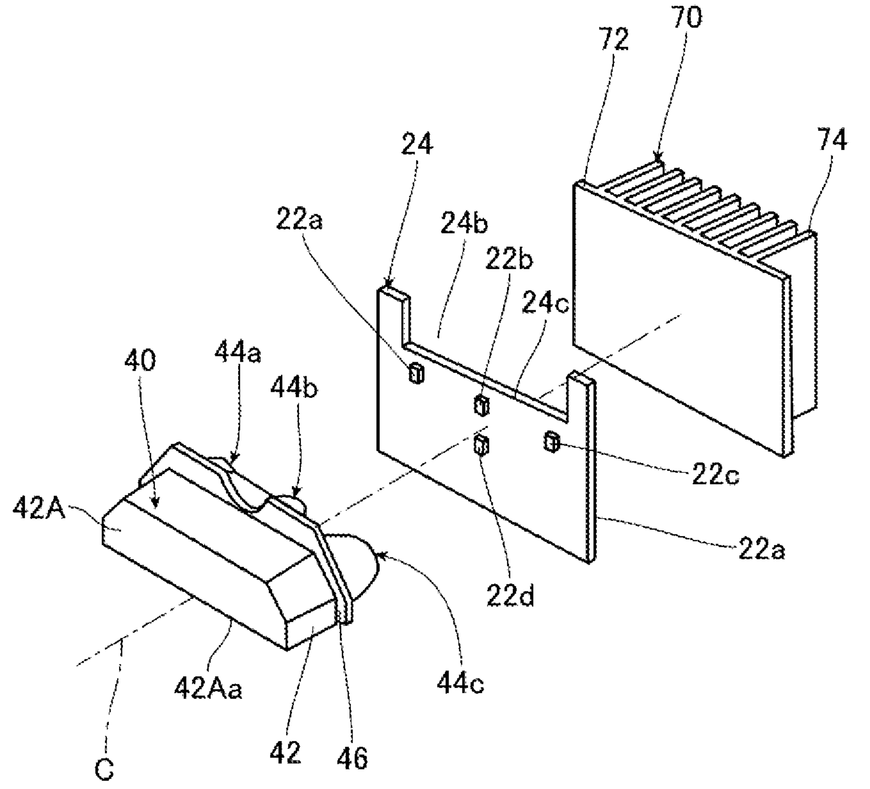
FIG. 4 is an exploded perspective view of a light guidance body, a substrate, and a heat sink when viewed obliquely from the front.
Figure 5:
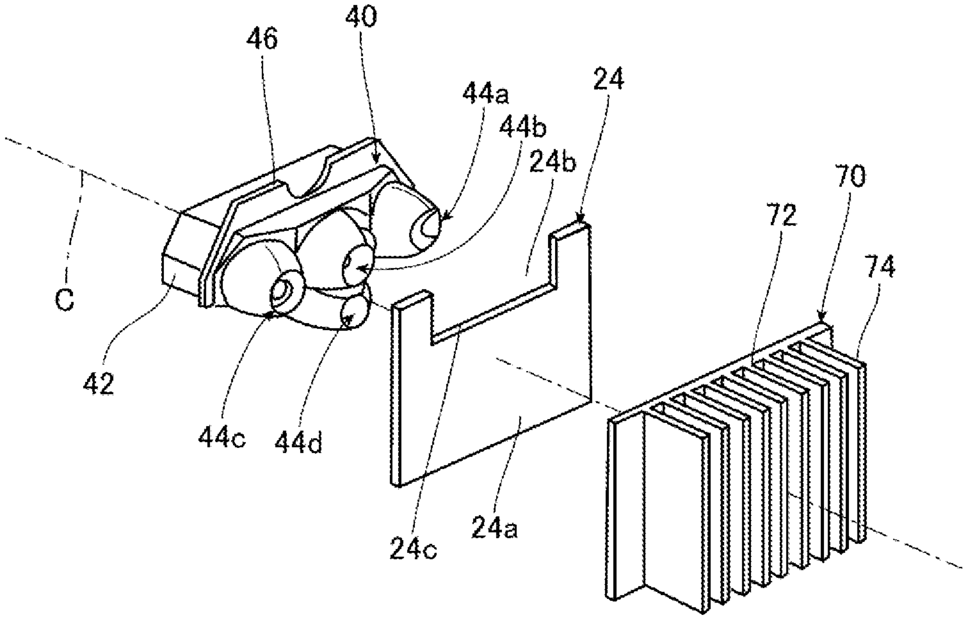
FIG. 5 is an exploded perspective view of the light guidance body, the substrate, and the heat sink when viewed diagonally from the rear.

FIG. 4 is an exploded perspective view of the light guidance body 40, the substrate 24, and the heat sink 70 when viewed obliquely from the front, and FIG. 5 is an exploded perspective view of the light guidance body 40, the substrate 24, and the heat sink 70 when viewed obliquely from the rear. In the lamp unit 10 of the present embodiment, the light source **22*a* is disposed on the right side of the light source 22*b* with an interval therebetween, the light source 22*c* is disposed on the left side of the light source 22*b* with an interval therebetween, the light source 22***b* is disposed above the optical axis C of the projection lens 30, and the light source 22*d* is disposed below the optical axis C. Each of the light sources 22*a*, 22*b*, 22*c*, and 22*d* is a phosphor type light emitting diode (LED) that emits white light, and is disposed in a state in which each vertically long rectangular light emission surface thereof faces forwards.

The four light sources 22*a*, 22*b*, 22*c*, and 22*d* are electrically connected to a connector (not illustrated) via a conductive pattern (not illustrated) provided on the substrate 24. The connector is provided at a lower end center portion of the front surface of the substrate 24, and when a power supply side connector (not illustrated) is attached to the connector, power is supplied to each of the light sources 22*a*, 22*b*, 22*c*, and 22*d*. As a result, the light sources 22*a*, 22*b*, 22*c*, and 22*d* are turned on. Among the four light sources 22*a*, 22*b*, 22*c*, and 22*d*, the three light sources 22*a*, 22*b*, and 22*c* are turned on when a low beam light distribution pattern is formed, and the remaining one light source 22*d* is additionally turned on when a high beam light distribution pattern is formed.

Referring back to FIGS. 1, 2, and 3, the description will be continued. The heat sink 70 radiates heat generated from the light sources 22*a*, 22*b*, 22*c*, and 22*d* and transferred from the substrate 24. The heat sink 70 is made of metal, and an example of the metal includes aluminum. The heat sink 70 is disposed on a back surface 24*a* of the substrate 24.

The heat sink 70 mainly includes a base plate 72 formed to extend along a vertical plane orthogonal to the optical axis C of the projection lens 30, and a plurality of heat radiation fins 74 formed to extend rearwards from the base plate 72 along the vertical plane. The base plate 72 is disposed on the back surface 24*a* of the substrate 24, and the heat radiation fins 74 are disposed in parallel with an interval therebetween in the horizontal direction on a surface of the base plate 72, in which the surface is located on a side opposite to a side facing the back surface 24*a*. The heat sink 70 is supported by the lens holder 50 together with the substrate 24 in a state of being in surface contact with the back surface 24*a* of the substrate 24 on the front surface of the base plate 72. The substrate 24 and the heat sink 70 are supported by the lens holder 50 by mechanical coupling. Specifically, the substrate 24 and the heat sink 70 are fixed to the lens holder 50 by being screwed to the lens holder 50 at two left and right positions. The heat radiation fins 74 are disposed in parallel with an interval therebetween on a surface of the base plate 72, in which the surface is located on a side opposite to a side facing the substrate 24.

The projection lens 30 is disposed in front of the light sources 22*a*, 22*b*, 22*c*, and 22*d*, light emitted from each of the light sources is incident thereon, and a divergence angle of the light incident on the projection lens 30 is adjusted. In the projection lens 30, the incident surface is formed in a convex shape toward the rear, the emission surface is formed in a convex shape toward the front, and the projection lens 30 is a biconvex aspherical lens. A rear focal point F of the projection lens 30 is located in the vicinity of or on a first emission surface 42A (described later) of the light guidance body 40. The light, the divergence angle of which is adjusted by the projection lens 30, is emitted from the vehicular lamp 100 toward the front of the vehicle via the translucent cover 104.

The projection lens 30 is made of resin such as colorless and transparent acrylic. The projection lens 30 is supported by the lens holder 50 at an outer peripheral flange part 32 of the projection lens 30.

The lens holder 50 is a cylindrical member formed to extend in the forward-and-rearward direction of the lamp unit 10, and is made of resin such as opaque polycarbonate. An annular lens support part 52 to which the outer peripheral flange part 32 of the projection lens 30 is fixed is provided at the front end portion of the lens holder 50. The projection lens 30 is fixed to the lens holder 50 by, for example, laser welding in a state in which the outer peripheral flange part 32 is pressed against the lens support part 52 from the front side. In addition, the lens support part 52 is provided with a pair of upper and lower positioning pins (not illustrated), and each of the outer peripheral flange parts 32 of the projection lens 30 is provided with a positioning hole (not illustrated) and a positioning groove (not illustrated) so as to face a corresponding one of the upper and lower positioning pins. When the upper positioning pin is engaged with the positioning hole and the lower positioning pin is engaged with the positioning groove, the projection lens 30 is positioned with respect to the lens holder 50 in a direction orthogonal to the forward-and-rearward direction of the lamp unit 10.

The light guidance body 40 is disposed between the projection lens 30 and the light sources 22*a*, 22*b*, 22*c*, and 22*d*. The light guidance body 40 is, for example, a primary lens, and guides light from each of the light sources 22*a*, 22*b*, 22*c*, and 22*d* so that the light enters the projection lens 30. The light guidance body 40 is made of a colorless and transparent resin such as polycarbonate.

As illustrated in FIGS. 1, 2, 3, and 4, the light guidance body 40 includes the first emission surface 42A that emits light forming a low beam light distribution pattern and a second emission surface 42B that emits light forming an additional light distribution pattern. The additional light distribution pattern is a light distribution pattern added to the low beam light distribution pattern when the high beam light distribution pattern is formed.

The first emission surface 42A is located at an upper portion of the front surface of the light guidance body 40, and is formed to extend along the rear focal plane of the projection lens 30. As illustrated in FIG. 4, the first emission surface 42A has a horizontally long rectangular outer shape in which left and right upper corner portions thereof are chamfered. A lower end edge 42Aa of the first emission surface 42A extends in the horizontal direction in a laterally different manner so as to pass through the vicinity above the rear focal point F of the projection lens 30.

The second emission surface 42B is located at a lower portion of the front surface of the light guidance body 40. In addition, the second emission surface 42B extends along a plane slightly inclined rearwards with respect to a vertical plane orthogonal to the optical axis C of the projection lens 30 at a position spaced apart from the rear focal plane of the projection lens 30 toward the rear side of the lamp unit 10 by a certain amount. The second emission surface 42B has a substantially oblong elliptical outer shape with a cut-out upper portion. Most of the second emission surface 42B is located below the optical axis C.

The light guidance body 40 includes a block part 42 formed to extend rearwards while substantially maintaining the outer shape of the first emission surface 42A. The lower surface of the block part 42 is formed as a connection surface 42C formed to extend in the horizontal direction rearwards from the lower end edge 42Aa of the first emission surface 42A to an upper end edge 42Ba of the second emission surface 42B.

The light guidance body 40 includes four incident surfaces 44*a*, 44*b*, 44*c*, and 44*d*, in which light from each of the four light sources 22*a*, 22*b*, 22*c*, and 22*d* is incident on a corresponding one of the incident surfaces 44*a*, 44*b*, 44*c*, and 44*d*. Similarly to the arrangement of the light sources 22*a*, 22*b*, 22*c*, and 22*d*, the incident surface 44*a* is located on the right side of the incident surface 44*b* with an interval therebetween, the incident surface 44*c* is located on the left side of the incident surface 44*b* with an interval therebetween, the incident surface 44*b* is located above the optical axis C of the projection lens 30, and the incident surface 44*d* is located below the optical axis C. The incident surfaces 44*a*, 44*b*, and 44*c* are located on the front side with respect to the respective three light sources 22*a*, 22*b*, and 22*c*, and are located on the rear side with respect to the block part 42. The incident surface 44*d* is located on the front side with respect to the light source 22*d*, and is located on the rear side with respect to the second emission surface 42B.

The block part 42 guides the light incident from each of the incident surfaces 44*a*, 44*b*, and 44*c* to the first emission surface 42A directly or after totally reflecting the light. Further, the block part 42 totally reflects, on the connection surface 42C, light reaching the connection surface 42C and then guides the light to the first emission surface 42A. A portion of the light guidance body 40 excluding the block part 42 guides the light from the incident surface 44*d* to the second emission surface 42B directly or after totally reflecting the light.

As illustrated in FIG. 2, in the light guidance body 40, an outer peripheral flange part 46 is provided at an upper portion of a rear end portion of the block part 42 and both left and right side portions thereof. The outer peripheral flange part 46 extends along a vertical plane orthogonal to the optical axis C. The light guidance body 40 is supported by the lens holder 50 at the outer peripheral flange part 46 in a state of being accommodated in the internal space of the lens holder 50.

The lens holder 50 is provided with a light transmission body supporting part 54 formed to extend along the outer peripheral flange part 46 of the light guidance body 40. The light guidance body 40 is fixed to the lens holder 50 by, for example, laser welding in a state in which the outer peripheral flange part 46 is pressed against the rear surface of the light transmission body supporting part 54 from the rear side. In addition, a pair of left and right positioning pins (not illustrated) is provided in the light transmission body supporting part 54, and a pair of left and right positioning holes is provided in the outer peripheral flange part 46. When the positioning pin is engaged with the positioning hole, the light guidance body 40 is positioned in the direction orthogonal to the unit forward-and-rearward direction with respect to the lens holder 50.

Figure 6:
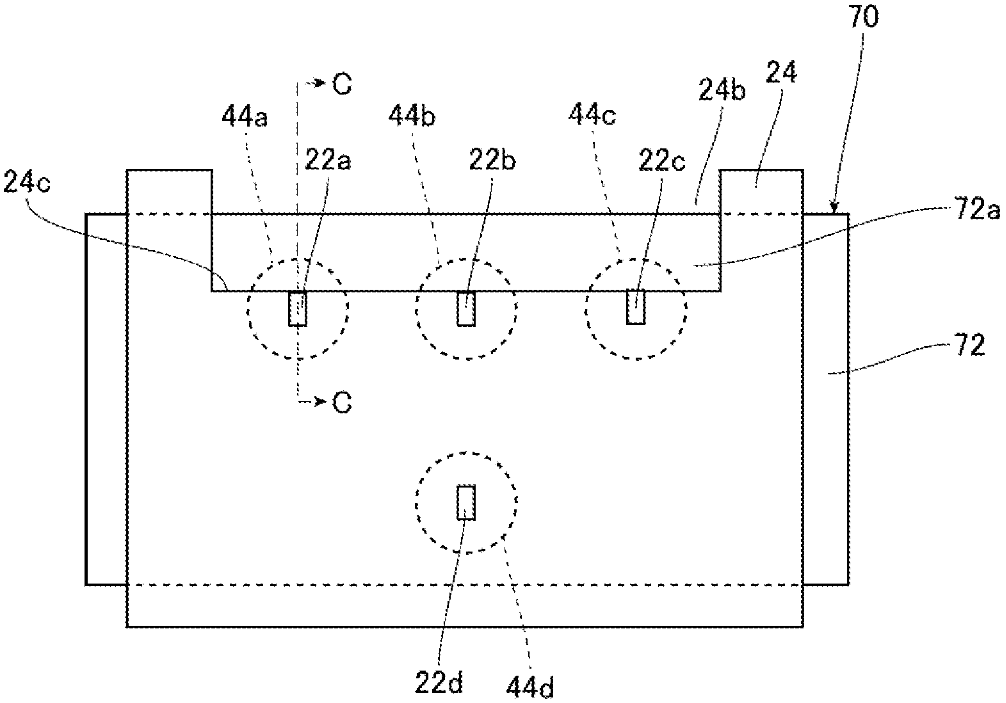
FIG. 6 is a front view of the substrate.

FIG. 6 is a front view of the substrate 24. In FIG. 6, a portion of the base plate 72, the portion overlapping the substrate 24, and the incident surfaces 44*a*, 44*b*, 44*c*, and 44*d* are indicated by broken lines. When the substrate 24 is viewed from the front, the light sources 22*a*, 22*b*, 22*c*, and 22*d* are respectively located inside the outer peripheral edges of the incident surfaces 44*a*, 44*b*, 44*c*, and 44*d*.

A part of the substrate 24 is cut out, and the substrate 24 is provided with a slit-shaped opening 24*b*. The opening 24*b* is elongated in the horizontal direction in which the three light sources 22*a*, 22*b*, and 22*c* are arranged, and the opening is longer than a space between the light source 22*a* and the light source 22*c*. The opening 24*b* is provided on the opposite side of the light source 22*d* with respect to the three light sources 22*a*, 22*b*, and 22*c*. In a case where the substrate 24 is viewed from the front, the upper end edge of each of the light sources 22*a*, 22*b*, and 22*c* overlaps an edge 24*c* of the substrate 24, in which the edge 24*c* is in contact with the lower end edge of the opening 24*b*. The opening 24*b* allows the base plate 72 to have a non-overlapping part 72*a* that does not overlap the substrate 24. The non-overlapping part 72*a* is a portion of the base plate 72, in which the portion is exposed from the substrate 24.

Figure 7:
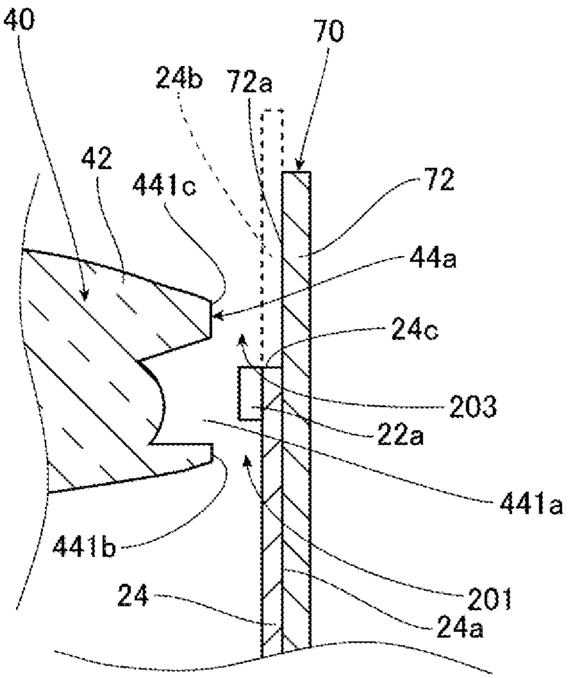
FIG. 7 is a cross-sectional view taken along line C-C illustrated in FIG. 6.

FIG. 7 is a cross-sectional view taken along line C-C illustrated in FIG. 6. In FIG. 7, the opening 24*b* is indicated by a broken line.

A first space 201 and a second space 203 are provided between the light source 22*a* side and the incident surface 44*a* of the light guidance body 40 on which light from the light source 22*a* is incident. The first space 201 and the second space 203 are flow paths through which gas can flow. The first space 201 and the second space 203 are also respectively provided between the light source 22*b* side and the incident surface 44*b* of the light guidance body 40, and between the light source 22*c* side and the incident surface 44*c* of the light guidance body 40. Here, the first space 201 and the second space 203 have the same configuration. Therefore, a description will be given using the first space 201 and the second space 203 on the light source 22*a* side. In addition, the configurations of the incident surfaces 44*b* and 44*c* are the same as the configuration of the incident surface 44*a* described below.

The incident surface 44*a* is provided with a recessed part 441*a* recessed toward the projection lens 30. The recessed part 441*a* faces the substrate 24, the light source 22*a*, and the non-overlapping part 72*a*. Therefore, when the substrate 24 is viewed from the front, the recessed part 441*a* overlaps the substrate 24, the edge 24*c* of the substrate 24, the light source 22*a*, and the non-overlapping part 72*a*.

The incident surface 44*a* includes a first region 441*b* including a part of the outer peripheral edge of the incident surface 44*a* and a second region 441*c* including the other part of the outer peripheral edge of the incident surface 44*a*. The first region 441*b* is provided below the second region 441*c*. The first region 441*b* and the second region 441*c* are provided on the same plane outside the recessed part 441*a*, but may be provided on different planes. The first region 441*b* and the second region 441*c* are located closer to the projection lens 30 than to the light emission surface of the light source 22*a*.

The first region 441*b* faces the substrate 24, and the first space 201 is provided between the first region 441*b* and the substrate 24. Therefore, when the substrate 24 is viewed from the front, the first region 441*b* overlaps the first space 201 and the substrate 24, and the substrate 24 is disposed on the side opposite to the first region 441*b* with the first space 201 interposed therebetween.

The second region 441*c* faces the non-overlapping part 72*a*, and the second space 203 is provided between the second region 441*c* and the non-overlapping part 72*a*. Therefore, when the substrate 24 is viewed from the front, the second region 441*c* overlaps the second space 203 and the non-overlapping part 72*a*, the substrate 24 is not disposed on the side opposite to the second region 441*c*, and the non-overlapping part 72*a* is disposed on the side opposite to the second region 441*c* with the second space 203 interposed therebetween. Further, the second space 203 is in contact with the base plate 72.

The second space 203 is provided above the first space 201 and is configured to communicate with the first space 201 via the recessed part 441*a*. Therefore, the recessed part 441*a* is provided between the first space 201 and the second space 203, and when the substrate 24 is viewed from the front, a boundary between the first space 201 and the second space 203 overlaps the recessed part 441*a*, but the boundary may not overlap the recessed part 441*a*. Since the non-overlapping part 72*a* is farther from the incident surface 44*a* than the substrate 24, the second space 203 is wider than the first space 201 in the optical axis C direction which is the emission direction of the light from the light source 22*a*. In addition, the second space 203 is longer than the first space 201 in the vertical direction, and has a greater depth than that of the first space 201 in the width direction of the substrate 24, which is a direction orthogonal to the direction of the optical axis C and the vertical direction. The second space 203 is continuous with a space above the light guidance body 40 in the internal space of the lamp chamber. The upper space is wider than the second space 203. As described above, since the second space 203 communicates with the first space 201 via the recessed part 441*a*, the light source 22*a* and the edge 24*c* are located between the first space 201 and the second space 203.

Next, a description will be given as to a low beam light distribution pattern and a high beam light distribution pattern, each of which is formed by light emitted from the vehicular lamp 100. Each light distribution pattern will be described as being formed on a virtual vertical screen disposed 25 m ahead of a vehicle.

First, the low beam light distribution pattern will be described. Most of the light from the light source 22*b* incident on the light guidance body 40 from the incident surface 44*b* directly reaches the first emission surface 42A, and is emitted from the first emission surface 42A toward the projection lens 30 as obliquely downward light. In addition, a part of the light from the light source 22*b* reaches the first emission surface 42A after being totally reflected by the connection surface 42C, and is emitted from the first emission surface 42A toward the projection lens 30 as obliquely upward light. The same applies to the light from the light sources 22*a* and 22*c*. Light from the light sources 22*a*, 22*b*, and 22*c* forms the low beam light distribution pattern. The low beam light distribution pattern is a light distribution pattern formed by inversely projecting a projection image formed on the first emission surface 42A by the projection lens 30. The low beam light distribution pattern is formed in an outer shape substantially corresponding to the outer shape of the first emission surface 42A. Since the light guidance body 40 is disposed such that the first emission surface 42A is positioned at the rear focal plane of the projection lens 30, in the low beam light distribution pattern, a cutoff line is formed by the lower end edge 42Aa of the first emission surface 42A.

Next, the high beam light distribution pattern will be described. A pair of portions of the light from the light source 22*d* incident on the light guidance body 40 from the incident surface 44*d* is emitted from the second emission surface 42B and reaches the projection lens 30. The light from the light source 22*d* forms an additional light distribution pattern positioned above the cutoff line of the low beam light distribution pattern with respect to the low beam light distribution pattern. The additional light distribution pattern is a light distribution pattern formed by allowing the projection lens 30 to inversely project a projection image formed on the rear focal plane of the projection lens 30 by the light emitted from the second emission surface 42B. When the additional light distribution pattern is added to the low beam light distribution pattern, the high beam light distribution pattern is formed. Since the upper end position of the projection image is defined by the lower end edge 42Aa of the first emission surface 42A, the lower end position of the additional light distribution pattern is defined by the cutoff line. Therefore, in the high beam light distribution pattern, the low beam light distribution pattern and the additional light distribution pattern are connected to each other without a gap therebetween.

Next, a flow of gas in the first space 201 and the second space 203 will be described.

Heat from the light source 22*a* warms gas between the light source 22*a* and the incident surface 44*a*, and the warmed gas rises. Since the second space 203 is provided above the first space 201, the warmed gas flows from the first space 201 to the second space 203. Since the width of the second space 203 is wider than the width of the first space 201, the gas easily flows from the first space 201 to the second space 203 and easily flows through the second space 203 as compared with a case in which the width of the second space 203 is the same as the width of the first space 201. In addition, the gas flows from the second space 203 to a space above the light guidance body 40. Since the upper space is wider than the second space 203, the gas easily flows from the second space 203 to the upper space. When the gas flows in this manner, heat is suppressed from being accumulated between the light source 22*a* and the incident surface 44*a*.

In the vehicular lamp disclosed in Patent Literature 1, the light source and the light guidance body are brought close to each other, so that most of the light from the light source enters the light guidance body, and utilization efficiency of the light is increased. Meanwhile, as the light source and the light guidance body are brought closer to each other, the heat from the light source tends to be accumulated between the light source and the light guidance body. When the light guidance body is made of resin, the light guidance body may be deformed by the heat accumulated between the light source and the light guidance body. When the light guidance body is deformed, a course of light traveling inside the light guidance body and a course of light traveling from the light guidance body to the projection lens are changed and, as such, a light distribution pattern formed by light emitted from the vehicular lamp may be changed to an unintended shape.

Therefore, the vehicular lamp 100 of the present embodiment includes the substrate 24, the light source 22*a* mounted on the substrate 24, the projection lens 30 disposed in front of the light source 22*a*, and the light guidance body 40 having the incident surface 44*a* on which light from the light source 22*a* is incident, in which the light guidance body 40 is disposed between the light source 22*a* and the projection lens 30 and emits the light toward the projection lens 30. The first space 201 and the second space 203 are provided on a side closer to the light source 22*a* than to the incident surface 44*a*, in which the first space 201 is provided between the first region 441*b* and the substrate 24, the first region 441*b* including, on the incident surface 44*a*, a part of an outer peripheral edge of the incident surface 44*a*, and the second space 203 communicates with the first space 201 and is in contact with the second region 441*c* including, on the incident surface 44*a*, the other part of the outer peripheral edge of the incident surface 44*a*. The width of the second space 203 is wider than the width of the first space 201 in an emission direction of the light from the light source 22*a*.

In the vehicular lamp 100, since the width of the second space 203 is wider than the width of the first space 201, gas can easily flow through the second space 203 as compared with a case in which the width of the second space 203 is the same as the width of the first space 201. When the gas easily flows, heat is less likely to be accumulated between the light source 22*a* and the incident surface 44*a*, thereby making it possible to suppress deformation of the light guidance body

40 due to the heat. When the deformation is suppressed, the light traveling inside the light guidance body 40 and the light traveling from the light guidance body 40 to the projection lens 30 can be suppressed from traveling in an unintended direction, thereby making it possible to suppress a change in the light distribution pattern to an unintended shape.

In addition, the vehicular lamp 100 further includes the heat sink 70 including the base plate 72 on which the substrate 24 is disposed, in which the base plate 72 includes the non-overlapping part 72*a* that does not overlap the substrate 24, and the second space 203 is provided between the second region 441*c* of the incident surface 44*a* and the non-overlapping part 72*a*.

According to this configuration, since the second space 203 is in contact with the base plate 72, heat between the light source 22*a* and the incident surface 44*a* can be easily transmitted from the second space 203 to the base plate 72 in contact with the second space 203 as compared with a case in which the second space 203 is not in contact with the base plate 72. Therefore, in the second region 441*c*, deformation of the light guidance body 40 due to heat can be suppressed. In addition, since the substrate 24 is not formed in the second space 203, the gas flowing through the second space 203 is less likely to receive radiant heat from the substrate 24 than the first space 201, thereby making it possible to suppress the temperature rise of gas. It is noted that the second space 203 may not be provided between the second region 441*c* of the incident surface 44*a* and the non-overlapping part 72*a*.

Further, the substrate 24 is disposed non-horizontally, and the second space 203 is provided above the first space 201.

The gas warmed by the heat between the light source 22*a* and the incident surface 44*a* rises. When the second space 203 is provided above the first space 201, the warmed gas flows from the first space 201 to the second space 203, the width of which is wider than that of the first space 201. In this case, the gas can easily flow as compared with a case in which the first space 201, the width of which is narrower than that of the second space 203, is provided above the second space 203, thereby making it possible to suppress accumulation of heat between the light source 22*a* and the incident surface 44*a* in natural air cooling. It is noted that the substrate 24 may not be disposed non-horizontally, and the second space 203 may not be provided above the first space 201.

Further, even when either the low beam light distribution pattern or the high beam light distribution pattern is formed, the light travels on the upper side of the light guidance body 40. Therefore, the temperature of the upper side of the light guidance body 40 tends to be higher than that of the lower side of the light guidance body 40 through which light travels only when the high beam light distribution pattern is formed. Since the upper side of the light guidance body 40 having a high temperature is in contact with the second space 203, the heat from the light guidance body 40 is transferred to the gas flowing through the second space 203 and rises together with the gas. Therefore, the temperature rise on the upper side of the light guidance body 40 is suppressed.

It is noted that the second space 203 of the present embodiment is provided between the second region 441*c* of the incident surface 44*a* and the non-overlapping part 72*a*, but the present invention is not limited thereto, and a modification of the second space 203 will be described below.

Figure 8:
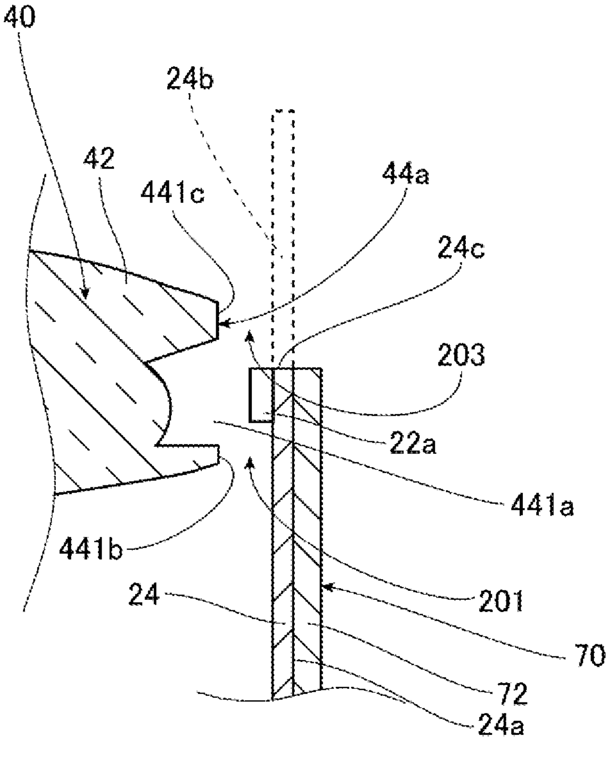
FIG. 8 is a diagram illustrating a first modification of a second space.

FIG. 8 is a diagram illustrating a first modification of the second space 203.

In the second space 203 of the present modification, the base plate 72 is not disposed on the side opposite to the second region 441*c* with the second space 203 interposed therebetween, and the second space 203 is not in contact with the base plate 72. Although not illustrated, the second region 441*c* may face the back surface of the lamp body 102.

Figure 9:
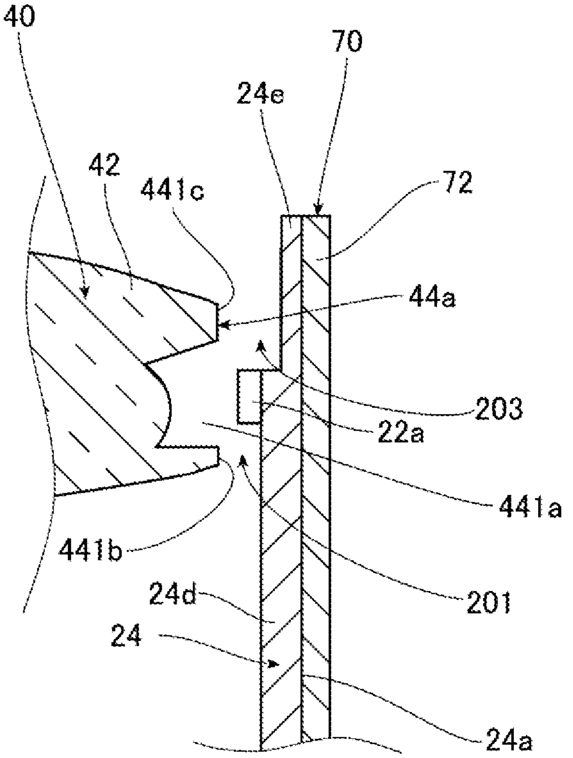
FIG. 9 is a diagram illustrating a second modification of the second space.

FIG. 9 is a diagram illustrating a second modification of the second space 203.

The substrate 24 of the present modification includes a main body part 24*d* including a region facing the first region 441*b* of the incident surface 44*a*, and an extension part 24*e* facing the second region 441*c* of the incident surface 44*a*, in which the extension part 24*e* is thinner than the main body part 24*d*. The extension part 24*e* is a portion obtained by cutting out a part of the main body part 24*d*, is connected to the main body part 24*d*, and extends upwards from the main body part 24*d*. When the substrate 24 is viewed from the front, the extension part 24*e* covers the base plate 72, and the non-overlapping part 72*a* is not provided in this modification. When the substrate 24 is viewed from the front, a boundary between the main body part 24*d* and the extension part 24*e* overlaps the recessed part 441*a* provided on the incident surface 44*a*. The second space 203 of the present modification is provided between the second region 441*c* of the incident surface 44*a* and the extension part 24*e*, and is not in contact with the base plate 72. The light sources 22*a*, 22*b*, 22*c*, and 22*d* are provided in the main body part 24*d*. Additionally, when the substrate 24 is viewed from the front, the upper edge of each of the light sources 22*a*, 22*b*, 22*c*, and 22*d* overlaps the upper edge of main body part 24*d*.

According to the configuration of the present modification, the substrate 24 can be widened as compared with a case in which the extension part 24*e* is not provided. It is noted that the configuration of the present modification is not essential.

Figure 10:
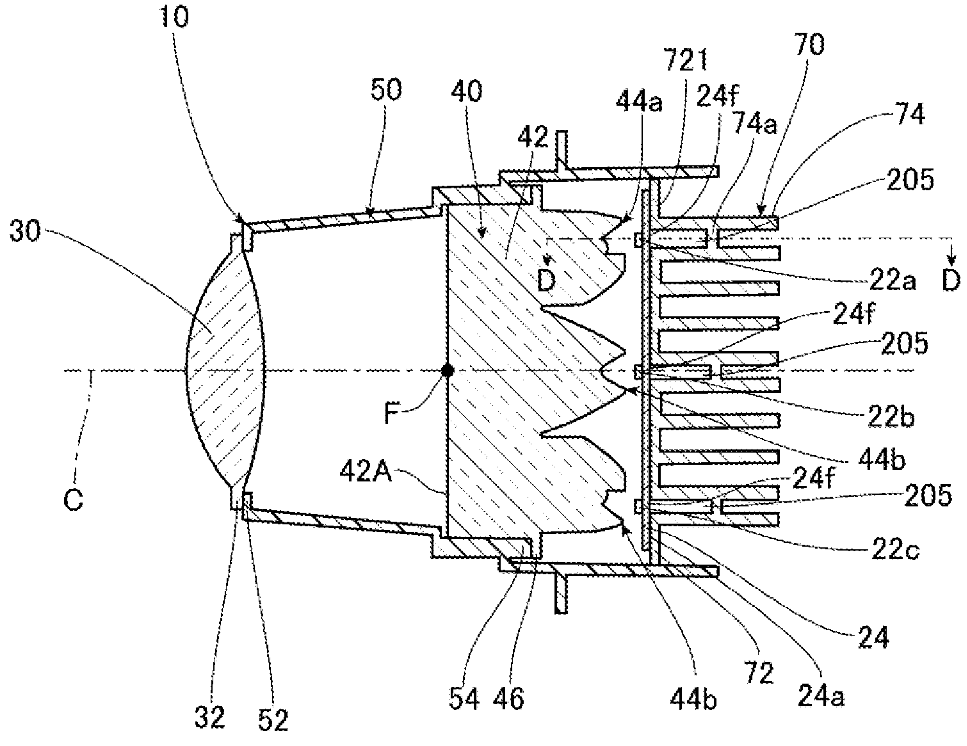
FIG. 10 is a diagram illustrating a modification of the heat sink.
Figure 11:
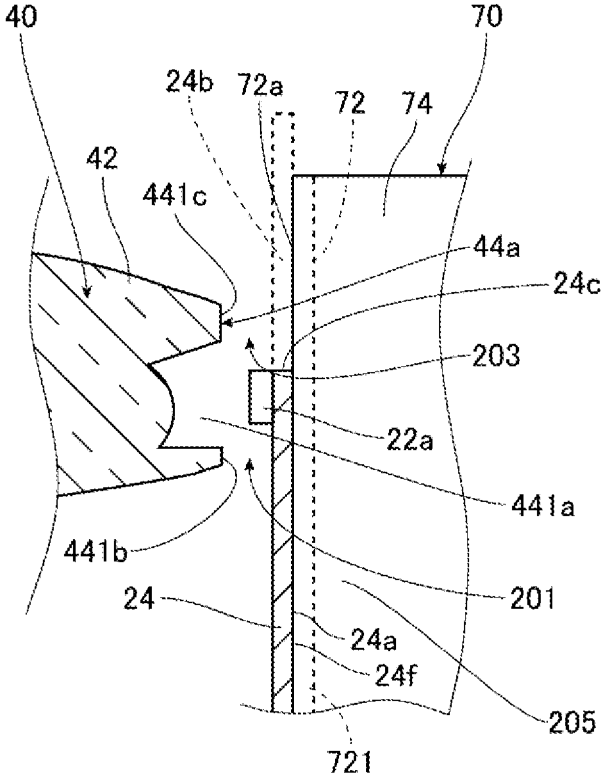
FIG. 11 is a cross-sectional view taken along line D-D illustrated in FIG. 10.

Further, the configuration of the heat sink 70 is not limited to the above description, and a modification of the heat sink 70 will be described below. FIG. 10 is a diagram illustrating a modification of the heat sink 70, and is a cross-sectional view taken along line A-A illustrated in FIG. 1. FIG. 11 is a cross-sectional view taken along line D-D illustrated in FIG. 10.

In the heat sink 70 of the present modification, the base plate 72 includes a plurality of base plate pieces 721 disposed side by side with an interval therebetween in the horizontal direction and disposed on the back surface 24*a* of the substrate 24. The base plate pieces 721 adjacent to each other are not connected to each other. The heat radiation fin 74 is disposed on each of the base plate pieces 721.

The heat radiation fins 74, each of which is provided in a corresponding one of the base plate pieces 721 adjacent to each other, are connected to each other by a connection part 74*a* formed to be integrated with the heat radiation fins 74, and the adjacent base plate pieces 721 are configured as one unit. The heat radiation fins 74 connected to each other include, in the base plate pieces 721 adjacent to each other, the heat radiation fin 74 located closest to the other base plate piece 721 of the one base plate pieces 721 and the heat radiation fin 74 located closest to the one base plate piece 721 of the other base plate pieces 721. The connection part 74*a* is provided in the heat radiation fin 74. The connection part 74*a* has a rectangular outer shape, and extends from the upper end to the lower end of each of the principal surfaces facing each other among the heat radiation fins 74 adjacent to each other in the vertical direction.

Since the base plate pieces 721 are disposed side by side with an interval therebetween as described above, an exposed region 24_f_ exposed from the base plate 72 and located on the back surface 24_a_ of the substrate 24 is provided between the base plate pieces 721 adjacent to each other. Therefore, the substrate 24 is provided with the exposed region 24_f_ exposed from the base plate 72 and located on the back surface 24_a_. The exposed region 24_f_ is a region exposed between the base plate pieces 721 adjacent to each other and located on the back surface 24_a_, and is also a region exposed between the heat radiation fins 74 adjacent to each other on the base plate pieces 721 adjacent to each other and located on the back surface 24_a_. The exposed region 24_f_ may be exposed in at least a part of the back surface 24_a_, in which the part is located between the heat radiation fins 74 adjacent to each other. The exposed region 24_f_ is located on the opposite side of the light sources 22_a_, 22_b_, and 22_c_ with respect to the substrate 24, and extends from the upper end to the lower end of the substrate 24 in the vertical direction. Therefore, there are three exposed regions 24_f_, and each of the exposed regions 24_f_ overlaps a corresponding one of the light sources 22_a_, 22_b_, and 22_c_ and a corresponding one of the incident surfaces 44_a_, 44_b_, and 44_c_ when the substrate 24 is viewed from the front. The exposed region 24_f_ overlapping the light source 22_b_ and the incident surface 44_b_ also overlaps the light source 22_d_ and the incident surface 44_d_. Therefore, when the substrate 24 is viewed from the front, the base plate pieces 721 adjacent to each other are disposed in parallel with an interval therebetween so as not to overlap the light sources 22_a_, 22_b_, 22_c_, and 22_d_.

The heat sink 70 is provided with a third space 205 in contact with the exposed region 24_f_, the base plate 72, and the heat radiation fins 74 adjacent to each other. The third space 205 is a heat sink side space provided between the heat radiation fins 74 adjacent to each other. Since the number of exposed regions 24_f_ is three, three third spaces 205 are also provided. The configurations of the respective third spaces 205 are the same. Since the connection part 74_a_ is provided in the present modification, the third space 205 is a slit surrounded by the exposed region 24_f_, the base plate pieces 721 adjacent to each other, the heat radiation fins 74 adjacent to each other, and the connection part 74_a_. Further, the third space 205 is opened on the upper end side and the lower end side. It is noted that the third space 205 is opened rearwards when the connection part 74_a_ is not provided or when the connection part 74_a_ is provided partially between the upper end and the other end of the heat radiation fin 74. The third space 205 extends from the upper end to the lower end of the base plate 72 in the vertical direction. The third space 205 is a flow path through which gas can flow.

When the substrate 24 is viewed from the front, the third space 205 overlaps the substrate 24. Further, when the substrate 24 is viewed from the front, each of the third spaces 205 overlaps a corresponding one of the light sources 22_a_, 22_b_, 22_c_, and 22_d_ and a corresponding one of the incident surfaces 44_a_, 44_b_, 44_c_, and 44_d_. As described above, since the exposed region 24_f_ overlapping the light source 22_b_ also overlaps the light source 22_d_, the third space 205 overlapping the light source 22_b_ and the incident surface 44_b_ also overlaps the light source 22_d_ and the incident surface 44_d_. In the horizontal direction, the width of each of the third spaces 205 is wider than the width of each of the light sources 22_a_, 22_b_, 22_c_, and 22_d_. In the horizontal direction, the width of each of the third spaces 205 is narrower than the maximum width of each of the incident surfaces 44_a_, 44_b_, 44_c_, and 44_d_. The width of each of the third spaces 205 may be the same as or narrower than the width of each of the light sources 22_a_, 22_b_, and 22_c_. The width of each of the third spaces 205 may be the same as or wider than the maximum width of each of the incident surfaces 44_a_, 44_b_, 44_c_, and 44_d_. The third space 205 overlaps the substrate 24 and merges with the second space 203 when the substrate 24 is viewed from the front.

As described above, in the heat sink 70 of the present modification, the third space 205 in contact with the exposed region 24_f_ exposed from the base plate 72 in at least a part of the back surface 24_a_ of the substrate 24, in which the part is located between the heat radiation fins 74 adjacent to each other, the base plate 72, and the heat radiation fins 74 adjacent to each other is provided between the heat radiation fins 74 adjacent to each other.

In the vehicular lamp 100, the substrate 24 is made of metal, and the thermal conductivity of metal is higher than the thermal conductivity of resin as compared with a case in which the substrate 24 is made of resin, so that the heat from the light source 22_a_ can be easily transferred to the base plate 72 via the substrate 24. Since the heat transferred to the base plate 72 is radiated from the heat radiation fin 74, the substrate 24 can be easily cooled. In addition, in the vehicular lamp 100, since the exposed region 24_f_ is in contact with the third space 205, heat is also directly radiated from the exposed region 24_f_ which is a part of the substrate 24. In this case, the substrate 24 can be easily cooled as compared with a case in which heat is not directly radiated from the substrate 24. When the substrate 24 is cooled in this manner, the heat from the light source 22_a_ can be easily transferred to the substrate 24, and cooling efficiency of the light source 22_a_ can be improved. Furthermore, when the light source 22_a_ is cooled, the wavelength of light emitted from the light source 22_a_ can be suppressed from being shifted by heat, and light of a predetermined color can be emitted. Furthermore, when the heat from the light source 22_a_ is transferred to the substrate 24, deformation of the light guidance body 40 due to the heat can be further suppressed. It is noted that the configuration of the present modification is not essential.

In addition, in the vehicular lamp 100 of the present modification, the third space 205 merges with the second space 203. In this configuration, when the gas flows from the third space 205 to the second space 203 and the gas flowing through the third space 205 is faster than the gas flowing through the second space 203, the gas flowing through the second space 203 is drawn by the gas merging with the second space 203 from the third space 205. As a result, the speed of the gas flowing through the second space 203 increases. Therefore, the light guidance body 40 can be cooled. Conversely, when the gas flowing through the second space 203 is faster than the gas flowing through the third space 205, the gas flowing through the third space 205 is drawn by the gas flowing through the second space 203, and the speed of the gas flowing through the third space 205 increases. Therefore, the heat sink 70 can be cooled. Further, the third space 205 is in contact with the exposed region 24_f_ of the back surface 24_a_ of the substrate 24. When the speed of the gas flowing through the third space 205 increases as described above, the substrate 24 can be cooled via the exposed region 24_f_. It is noted that the third space 205 may not merge with the second space 203.

In addition, in the vehicular lamp 100 of the present modification, the third space 205 overlaps the light source 22_a_. In this case, as compared with a case in which the third space 205 does not overlap the light source 22_a_, the heat from the light source 22_a_ can be easily transferred to the gas flowing through the third space 205 via the substrate 24. It is noted that at least a part of the third space 205 may overlap the light source 22_a_. Here, the third space 205 overlapping the light source 22a has been described, but the same applies to the third space 205 overlapping another light source. When the substrate 24 is viewed from the front, the third space 205 may not overlap the light source 22a.

It is noted that the third space 205 is not necessarily provided at three locations, and may be provided so as to overlap any one of the light source 22a, the light sources 22b and 22d, and the light source 22c when the substrate 24 is viewed from the front. Further, when the substrate 24 is viewed from the front, the third space 205 may be provided so as not to overlap the light sources 22a, 22b, 22c, and 22d. The third space 205 may overlap at least a part of the incident surface 44a. When the substrate 24 is cooled, the heat from the light source 22a is easily transferred to the substrate 24. Therefore, when the third space 205 overlaps at least a part of the incident surface 44a, the heat from the light source 22a is less likely to be transferred to the incident surface 44a, and the heat is less likely to be accumulated between the light source 22a and the incident surface 44a, as compared with a case in which the third space 205 does not overlap the incident surface 44a. As a result, deformation of the light guidance body 40 due to the heat can be suppressed. When the deformation of the light guidance body 40 is suppressed, the light traveling inside the light guidance body 40 and the light emitted from the light guidance body 40 can be suppressed from traveling in an unintended direction, and a change in the light distribution pattern to an unintended shape can be suppressed. In the above description, the incident surface 44a has been used, but the same applies to the other incident surfaces. The exposed region 24f may be a portion of the back surface 24a of the substrate 24, in which the portion is exposed from the base plate 72. Therefore, the exposed region 24f may be exposed by a through hole provided in the base plate 72. Further, the base plate pieces 721 adjacent to each other are not connected to each other, but may be connected to each other such that the exposed region 24f is provided. The non-overlapping part 72d may be the above-described through hole.

Second Embodiment

Next, a second embodiment of the present invention will be described. It is noted that the same or equivalent components as those of the first embodiment are denoted by the same reference numerals and redundant description is omitted unless otherwise specified.

Figure 12:
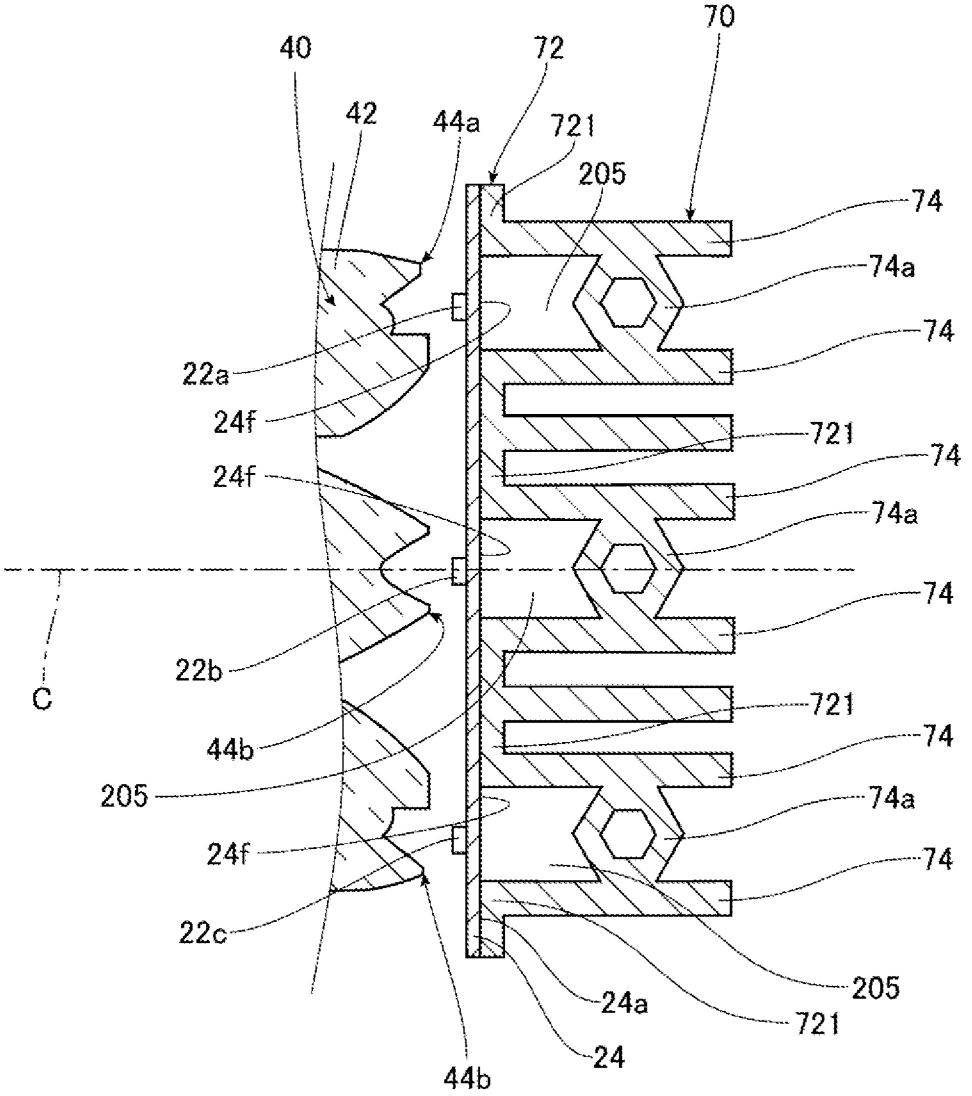
FIG. 12 is an enlarged view of the periphery of a base plate according to a second embodiment of the present invention.

FIG. 12 is an enlarged view of the periphery of the base plate 72 according to the present embodiment. In the base plate of the present embodiment, the configuration of the connection part 74a is different from the configuration of the connection part 74a illustrated in FIG. 10 of the first embodiment.

The connection part 74a of the present embodiment has a hexagonal outer shape and an inner shape, and has a hollow shape. The connection part 74a extends from the upper end to the lower end of each of the principal surfaces facing each other among the heat radiation fins 74 adjacent to each other in the vertical direction. The connection part 74a is integrated with the heat radiation fin, but may be separated from the heat radiation fin. The connection part 74a increases the surface area of the heat radiation fin 74. It is noted that the shape of the connection part 74a is not particularly limited. Further, the connection part 74a may be provided between the upper end and the other end of the principal surface. In addition, the connection part 74a may not be provided, and the heat radiation fins 74 may not be connected to each other. Additionally, when the plurality of heat radiation fins 74 are disposed on one base plate piece 721, the respective heat radiation fins 74 are not connected to each other, but may be connected to each other as described above.

Figure 13:
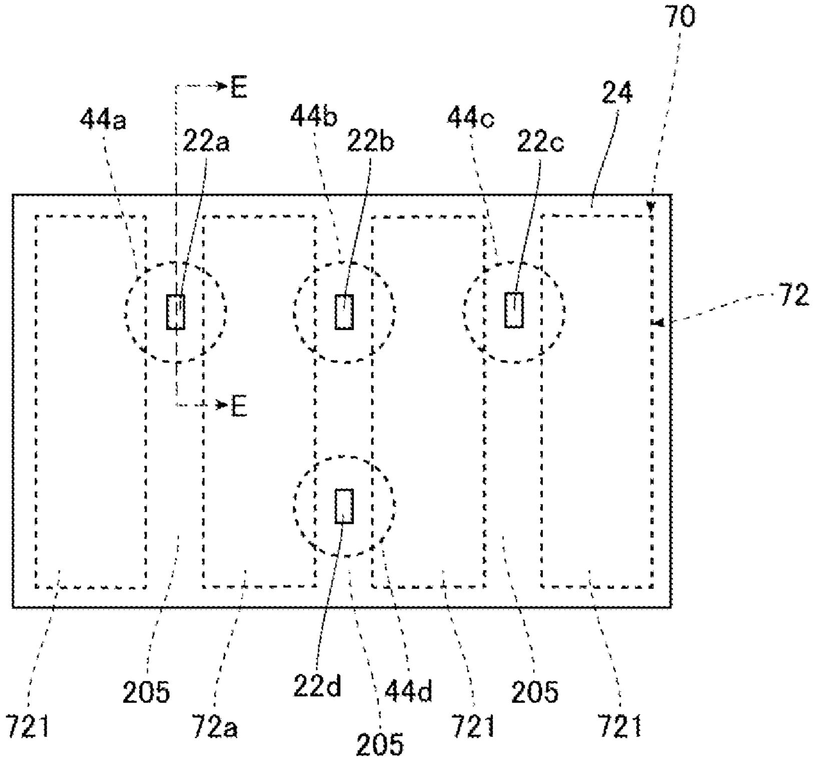
FIG. 13 is a front view of the substrate.

FIG. 13 is a front view of the substrate 24. In FIG. 13, a portion of the base plate piece 721, the portion overlapping the substrate 24, and the incident surfaces 44a, 44b, 44c, and 44d are indicated by broken lines. The base plate piece 721 is shown slightly smaller than the substrate 24 for ease of understanding. The substrate 24 of the present embodiment is different from that of the first embodiment in that the substrate 24 has a horizontally long rectangular shape, a part of the substrate 24 is not cut, and the opening 24b is not provided in the substrate 24.

Figure 14:
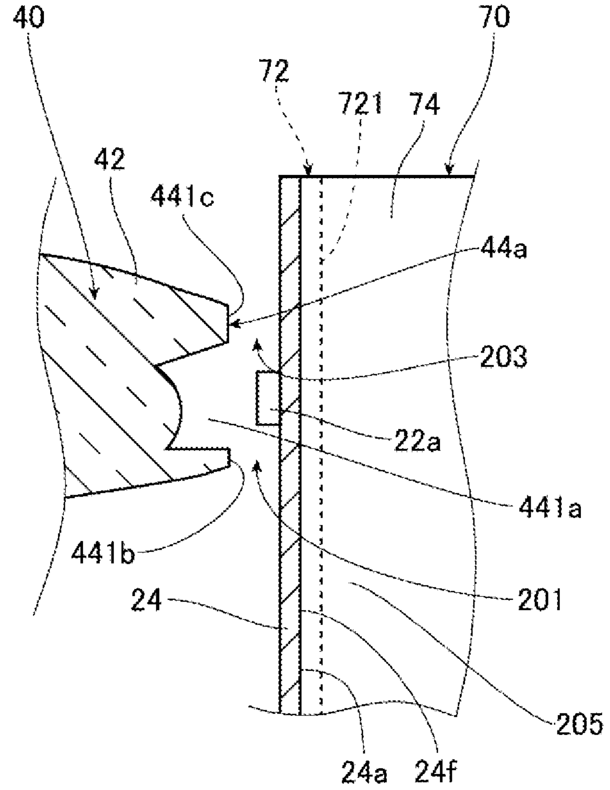
FIG. 14 is a cross-sectional view taken along line E-E illustrated in FIG. 13.

FIG. 14 is a cross-sectional view taken along line E-E illustrated in FIG. 13.

In the present embodiment as well, the first space 201, which is a light source-side space, is provided between the light source 22a side and the incident surface 44a of the light guidance body 40 on which the light from the light source 22a is incident. The substrate 24 of the present embodiment is not provided with the opening 24b described in the first embodiment. Therefore, the second region 441c of the light guidance body 40 faces the substrate 24, which is different from the first embodiment. In addition, the second space 203 of the present embodiment is different from that of the first embodiment in that the second space 203 is provided between the second region 441c and the substrate 24. Therefore, when the substrate 24 is viewed from the front, the second region 441c overlaps the second space 203 and the substrate 24, and the substrate 24 is disposed on the opposite side of the second region 441c with the second space 203 interposed therebetween.

Since the first region 441b and the second region 441c are provided on the same plane, the widths of the first space 201 and the second space 203 are the same in the optical axis C direction which is the emission direction of the light from the light source 22a. In the emission direction of the light from the light source 22a, the width of the first space 201 is narrower than the width of the third space 205, and the first space 201 and the second space 203 overlap the third space 205 when the substrate 24 is viewed from the front.

Next, transfer of heat from the light source 22a by driving of the light source 22a will be described.

Since the substrate 24 is made of metal, the heat from the light source 22a is transferred to the substrate 24 more than the gas in the first space 201 and the second space 203 between the light source 22a and the incident surface 44a. The heat transferred to the substrate 24 is transferred from the base plate piece 721 to the heat radiation fin 74, and is radiated from the heat radiation fin 74 and the connection part 74a. In addition, since the exposed region 24f is in contact with the third space 205, heat is also directly radiated from the exposed region 24f which is a part of the substrate 24. In this case, the substrate 24 is easily cooled as compared with a case in which heat is not directly radiated from the substrate 24. When the gas flows through the third space 205, the gas is in contact with the exposed region 24f. When the gas is in contact with the exposed region 24f, the substrate 24 is cooled as compared with a case in which the gas is not in contact with the exposed region 24f. As described above, the heat from the light source 22a is easily transferred to the substrate 24, and the light source 22a is cooled. Although the light source 22a has been described above, the same applies to heat from the other light sources 22b, 22c, and 22d.

It is noted that a part of the heat from the light source 22*a* warms the gas between the light source 22*a* and the incident surface 44*a*, and the warmed gas rises. As described in the first embodiment, the warmed gas flows from the second space 203 to the space above the light guidance body 40. When the gas flows, accumulation of heat is suppressed between the second spaces 203.

In the vehicular lamp disclosed in Patent Literature 2, the light source is cooled by heat radiation from the heat radiation fins, but there is a demand for facilitating cooling of the light source to improve cooling efficiency of the light source.

Therefore, the vehicular lamp 100 of the present embodiment includes the metal substrate 24, the light source 22*a* mounted on the front surface of the substrate 24, and the heat sink 70 disposed on the back surface 24*a* of the substrate 24. The heat sink 70 includes the base plate 72 disposed on the back surface 24*a* and the plurality of heat radiation fins 74 disposed in parallel with an interval therebetween on a surface of the base plate 72, in which the surface is located on a side opposite to a side facing the substrate 24. In the heat sink 70, the third space 205 in contact with the exposed region 24*f* exposed from the base plate 72 in at least a part of the back surface 24*a*, in which the part is located between the heat radiation fins 74 adjacent to each other, the base plate 72, and the heat radiation fins 74 adjacent to each other is provided between the heat radiation fins 74 adjacent to each other.

In the vehicular lamp 100, the substrate 24 is made of metal. In this case, since the thermal conductivity of metal is higher than the thermal conductivity of resin as compared with a case in which the substrate 24 is made of resin, heat from the light source 22*a* can be easily transferred to the base plate 72 via the substrate 24. Since the heat transferred to the base plate 72 is radiated from the heat radiation fin 74, the substrate 24 can be easily cooled. In addition, in the vehicular lamp 100, since the exposed region 24*f* is in contact with the third space 205, heat is also directly radiated from the exposed region 24*f* which is a part of the substrate 24. In this case, the substrate 24 can be easily cooled as compared with a case in which heat is not directly radiated from the substrate 24. When the substrate 24 is cooled in this manner, the heat from the light source 22*a* can be easily transferred to the substrate 24, and cooling efficiency of the light source 22*a* can be improved. Furthermore, when the light source 22*a* is cooled, the wavelength of light emitted from the light source 22*a* can be suppressed from being shifted by heat, and light of a predetermined color can be emitted.

The third space 205 overlaps the light source 22*a* when the substrate 24 is viewed from the front.

According to this configuration, as compared with a case in which the third space 205 does not overlap the light source 22*a*, the region of the substrate 24 overlapping the light source 22*a* can be easily cooled by the gas flowing through the third space 205. When the region is cooled, cooling efficiency of the light source 22*a* can be improved. Although the entire light source 22*a* overlaps the third space 205 of the present embodiment, the third space 205 may overlap at least a part of the light source 22*a*. Further, the third space 205 may not overlap the light source 22*a*.

When the substrate 24 is viewed from the front, the width of the third space 205, which is the heat sink side space, is wider than the width of the light source 22*a*.

In this configuration, when the width of the third space 205 increases, the width of the exposed region 24*f* increases, heat is easily transferred from the exposed region 24*f* to the third space 205, and the substrate 24 is easily cooled. Further, when the width of the third space 205 increases, the gas can easily flow through the third space 205. When the gas easily flows, heat is hardly accumulated in the third space 205, and the substrate 24 is easily cooled. When the substrate 24 is cooled, the heat from the light source 22*a* can be easily transferred to the substrate 24, and the cooling efficiency of the light source 22*a* can be improved. Furthermore, in this configuration, a region of the substrate 24 around the light source 22*a* can be cooled, and when the region is cooled, the heat from the light source 22*a* is diffused to the region, so that the cooling efficiency of the light source 22*a* can be further improved. It is noted that the width of the third space 205 may be equal to or smaller than the width of the light source 22*a*.

Additionally, the heat radiation fins 74 respectively provided in the base plate pieces 721 adjacent to each other are connected to each other.

According to this configuration, the base plate pieces 721 adjacent to each other with the heat radiation fin 74 interposed therebetween are configured as one unit. In this case, the number of attachment steps of the heat sink 70 can be reduced as compared with a case in which the heat radiation fins 74 are not connected to each other. It is noted that the heat radiation fins 74 may not be connected to each other.

Further, the vehicular lamp 100 of the present embodiment further includes the light guidance body 40 that has the incident surface 44*a* on which the light from the light source 22*a* is incident, is disposed in front of the light source 22*a*, and guides the light, in which the third space 205 overlaps the incident surface 44*a* when the substrate 24 is viewed from the front. It is noted that the third space 205 of the present embodiment overlaps a part of the incident surface 44*a*, but may overlap at least a part of the incident surface 44*a*.

As described above, when the substrate 24 is cooled, the heat from the light source 22*a* is easily transferred to the substrate 24. Therefore, when the third space 205 overlaps at least a part of the incident surface 44*a*, the heat from the light source 22*a* is less likely to be transferred to the incident surface 44*a* as compared with a case in which the third space 205 does not overlap the incident surface 44*a*. In addition, heat is less likely to be accumulated between the light source 22*a* and the incident surface 44*a*, and deformation of the light guidance body 40 including the incident surface 44*a* due to the heat can be suppressed. When the deformation of the light guidance body 40 is suppressed, the light traveling inside the light guidance body 40 and the light emitted from the light guidance body 40 can be suppressed from traveling in an unintended direction, and a change in the light distribution pattern to an unintended shape can be suppressed. It is noted that, when the substrate 24 is viewed from the front, the third space 205 may not overlap the incident surface 44*a*.

Although a relationship between the light source 22*a* and the third space 205 and a relationship between the incident surface 44*a* and the third space 205 have been described above, the same applies to a relationship between the other light sources 22*b*, 22*c*, and 22*d* and the third space 205 and a relationship between the incident surfaces 44*b*, 44*c*, and 44*d* and the third space 205.

It is noted that, although the entire third space 205 of the present embodiment has been described as overlapping the substrate 24, the present invention is not limited thereto, and a first modification of the third space 205 will be described below. The present modification is different from the third space 205 of the present embodiment in that a part of the third space 205 extends outside the substrate 24.

Figure 15:
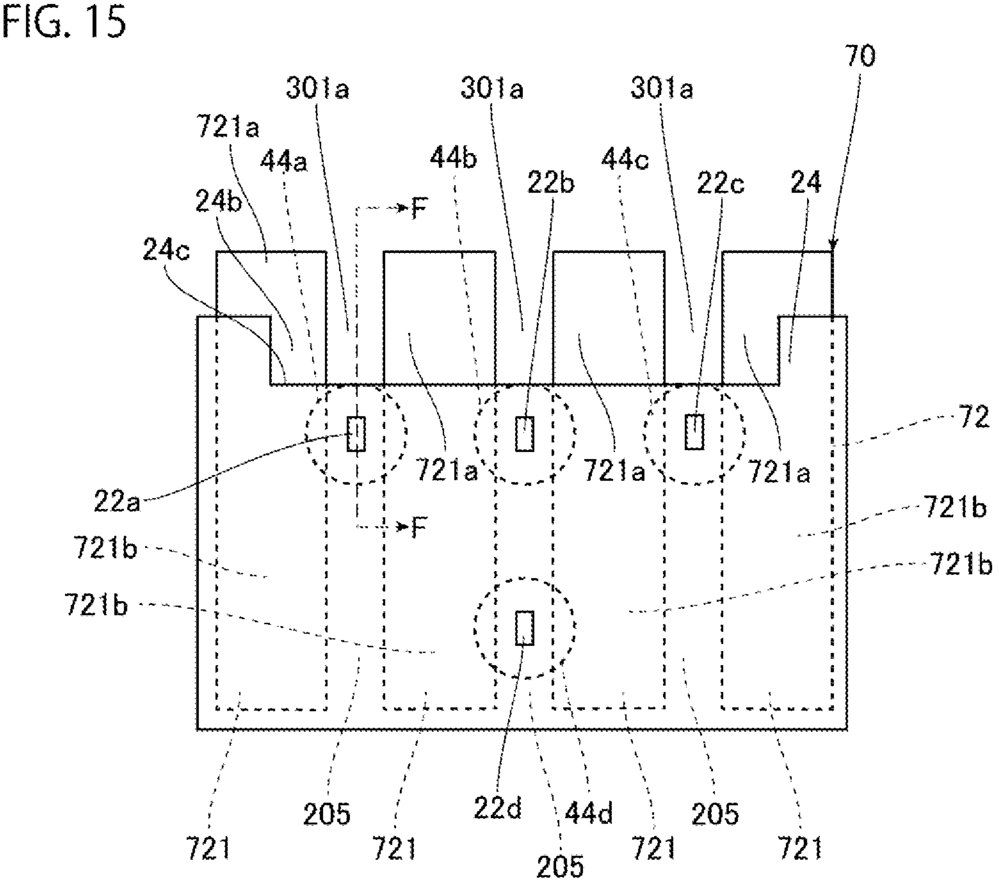
FIG. 15 is a front view of a substrate according to a first modification of the second embodiment.
Figure 16:
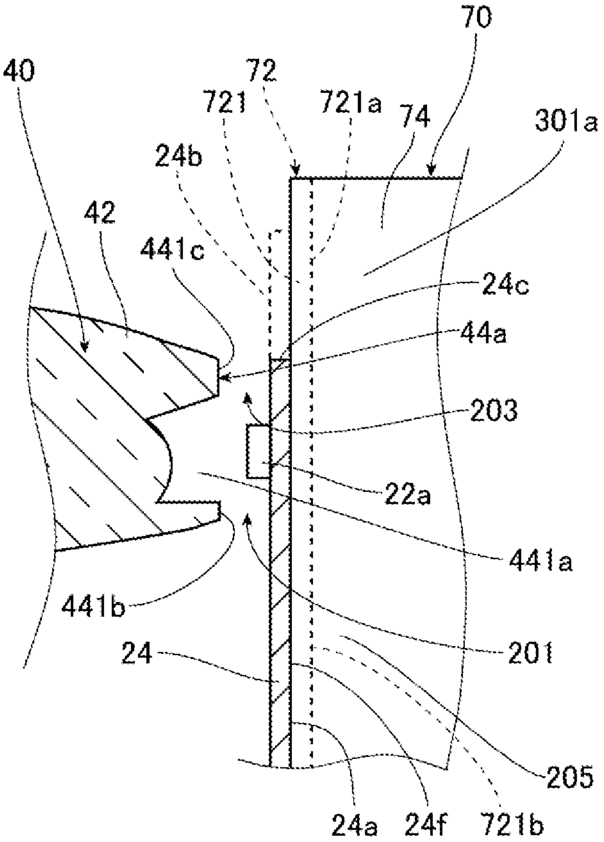
FIG. 16 is a cross-sectional view taken along line F-F illustrated in FIG. 15.

FIG. 15 is a front view of the substrate 24 according to the first modification of the present embodiment. FIG. 16 is a cross-sectional view taken along line F-F illustrated in FIG. 15.

The substrate 24 of the present modification has the same configuration as the substrate 24 of the first embodiment. Therefore, the opening 24*b* is provided in the substrate 24 of the present modification. When the substrate 24 is viewed from the front, an upper end edge of each of the light sources 22*a*, 22*b*, and 22*c* is located below an edge 24*c* of the substrate 24, in which the edge 24*c* is in contact with a lower end edge of the opening 24*b*. The opening 24*b* allows the base plate piece 721 of the base plate 72 to have a non-overlapping part 721*a* that does not overlap the substrate 24 and an overlapping part 721*b* that overlaps the substrate 24. The non-overlapping part 721*a* is a portion of the base plate piece 721, the portion being exposed from the substrate 24. The non-overlapping part 721*a* does not overlap the incident surfaces 44*a*, 44*b*, 44*c*, and 44*d*, the incident surfaces 44*a*, 44*b*, 44*c*, and 44*d* overlap the substrate 24, and a part of the outer peripheral edges of the incident surfaces 44*a*, 44*b*, and 44*c* overlaps the edge 24*c*. The edge 24*c* overlaps a boundary between the non-overlapping part 721*a* and the overlapping part 721*b*. Although not illustrated herein, the heat radiation fin 74 extends to the non-overlapping part 721*a*.

When the substrate 24 is viewed from the front, the third space 205 of the present modification extends to the edge 24*c* of the substrate 24 overlapping the boundary between the non-overlapping part 721*a* and the overlapping part 721*b*, and is opened on the non-overlapping part 721*a* side. Further, the third space 205 communicates with a non-overlapping part side space 301*a* provided between the non-overlapping parts 721*a* of the base plate pieces 721 adjacent to each other via the opening. The heat radiation fin 74 in contact with the third space 205 extends in the non-overlapping part 721*a*, and the heat radiation fin 74 is in contact with the non-overlapping part side space 301*a*. The non-overlapping part side space 301*a* is opened on the side of the substrate 24, above the substrate 24, and behind the substrate 24.

In this configuration, the third space 205 extends to the edge 24*c* of the substrate 24 overlapping the boundary between the non-overlapping part 721*a* and the overlapping part 721*b* when the substrate 24 is viewed from the front. In this case, the third space 205 is opened on the non-overlapping part 721*a* side. When the gas flowing through the third space 205 and the gas flowing through the second space 203 merge via the opening of the third space 205 and the non-overlapping part side space 301*a*, and the gas flowing through the third space 205 is faster than the gas flowing through the second space 203, the gas flowing through the second space 203 is drawn by the gas flowing through the third space 205, and the speed of the gas flowing through the second space 203 increases. Therefore, the light guidance body 40 can be cooled. Conversely, when the gas flowing through the second space 203 is faster than the gas flowing through the third space 205, the gas flowing through the third space 205 is drawn by the gas flowing through the second space 203, and the speed of the gas flowing through the third space 205 increases. Therefore, the heat sink 70 can be cooled. It is noted that the third space 205 may not extend to the edge 24*c*.

Figure 17:
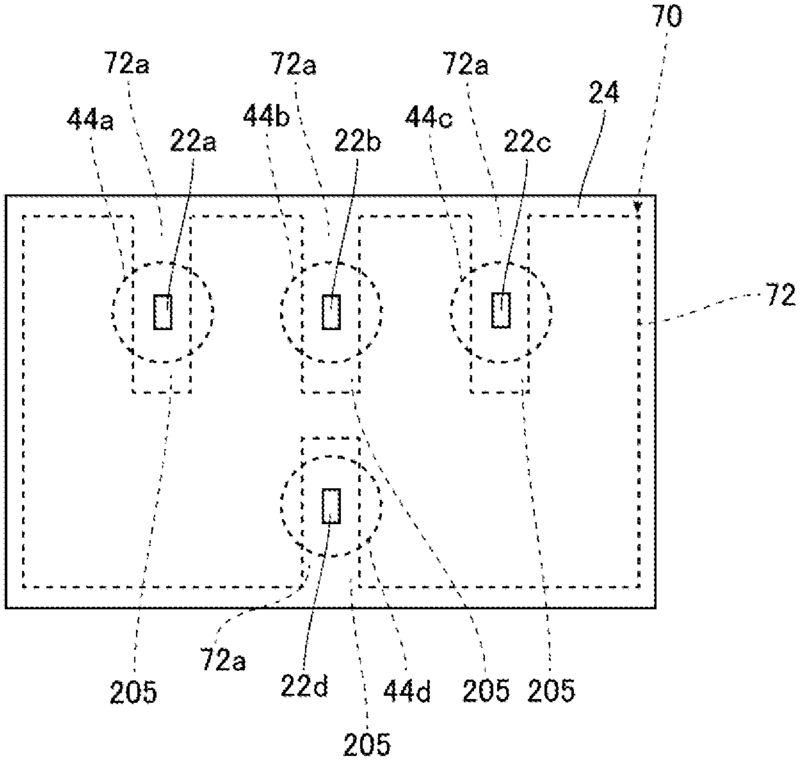
FIG. 17 is a front view of a substrate according to a second modification of the second embodiment.

Next, a second modification of the second embodiment will be described. FIG. 17 is a front view of the substrate 24 according to the second modification of the second embodiment. The present modification is different from the base plate 72 of the present embodiment in that the base plate piece 721 is not provided and one base plate 72 is provided. Additionally, the present modification is different from the third space 205 of the present embodiment in that the third space 205 is provided not between the base plate pieces 721 adjacent to each other but in the non-overlapping part 72*a* of the base plate 72.

The base plate 72 of the present modification is provided with the non-overlapping part 72*a* that does not overlap the substrate 24, and the non-overlapping part 72*a* is, for example, a slit. An exposed region 24*f* (not illustrated in FIG. 17) is provided on the back surface 24*a* by the non-overlapping part 72*a*. When the substrate 24 is viewed from the front, the exposed region 24*f* overlaps the non-overlapping part 72*a*. The third space 205 is in contact with the exposed region 24*f*, the base plate 72, and the heat radiation fins 74 adjacent to each other.

In the vehicular lamp 100 of the present modification, the third space 205 can be provided in one base plate 72 instead of being provided between the base plate pieces 721 adjacent to each other. It is noted that the non-overlapping part 72*a* of the present modification may be a through hole.

As described above, the present invention has been described by taking the above-described embodiments and modifications as examples, but the present invention is not limited thereto.

In the above embodiment and modification, the gas may flow from the first space 201 toward the second space 203 by a fan. In this case, the fan may be provided below the first space 201 for air blowing or may be provided above the second space 203 for suction. Alternatively, the gas may flow from the second space 203 toward the first space 201 by the fan. In this case, the fan may be provided below the first space 201 for suction or may be provided above the second space 203 for air blowing.

In the above embodiment and modification, the first space 201 and the second space 203 may be provided in a direction orthogonal to the emission direction of the light from the light sources 22*a*, 22*b*, and 22*c*, that is, in the horizontal direction. In this case, the fan is preferably provided on the first space 201 side or the second space 203 side as described above. When gas flows downwards by the fan, the first space 201 and the second space 203 may be provided on the light source 22*d* side.

In the above embodiment and modification, the non-overlapping part 72*a* may be a portion of the base plate 72, in which the portion is exposed from the substrate 24. Therefore, the non-overlapping part 72*a* may be exposed not only by the opening 24*b* but also by a through hole provided in the substrate 24, or may be exposed by being positioned above the upper end edge of the rectangular substrate 24 in which the opening 24*b* is not provided.

In the above embodiment and modification, the recessed part 441*a* may not be provided. Further, when the substrate 24 is viewed from the front, the edge 24*c* may overlap an edge of the recessed part 441*a*, in which the edge is in contact with the second region 441*c*.

In the above embodiment and modification, the second space 203 may be the same as the first space 201 or shorter than the first space 201 in the vertical direction. In addition, the second space 203 may have the same depth as that of the first space 201 or a depth narrower than that of the first space 201 in the width direction of the substrate 24 which is a direction orthogonal to the optical axis C direction and the vertical direction.

In the above embodiment and modification, the light guidance body 40 has been described as being made of a resin such as polycarbonate, but may be made of a resin such as colorless transparent acrylic or colorless transparent glass.

In the above embodiment and modification, it has been described that all of the four light sources 22*a*, 22*b*, 22*c*, and 22*d* have the vertically long rectangular light emission surface. However, for example, the four light sources may have a light emission surface having another outer shape such as a square or a horizontally long rectangular shape.

In the above embodiment and modification, it has been described that the light source for the low beam includes the three light sources 22*a*, 22*b*, and 22*c*, and the light source for the additional lighting includes one light source 22*d*, but the number of these light sources is not particularly limited.

In the above embodiment and modification, the vehicular lamp 100 is a headlight, but is not particularly limited. For example, the vehicular lamp 100 may emit light constituting an image to an irradiated object such as a road surface. In addition, in a case where the vehicular lamp is configured to irradiate an irradiated object such as a road surface with light constituting an image, a direction of light emitted by the vehicular lamp or a position at which the vehicular lamp is attached to the vehicle is not particularly limited. In addition, the color of the light emitted from the vehicular lamp is preferably white, but is not particularly limited.

The connection part 74*a* of the heat sink 70 illustrated in FIG. 10 of the first embodiment may have the same configuration as the connection part 74*a* of the heat sink 70 of the present embodiment. Further, the connection part 74*a* of the heat sink 70 of the second embodiment may have the same configuration as the connection part 74*a* of the heat sink 70 illustrated in FIG. 10 of the first embodiment. Further, the heat sink 70 of the first embodiment and the modification thereof may be disposed on the substrate 24 of the second embodiment and the modification thereof instead of the heat sink 70 of the second embodiment and the modification thereof. The heat sink 70 of the second embodiment and the modification thereof may be disposed on the substrate 24 of the first embodiment and the modification thereof instead of the heat sink 70 of the first embodiment and the modification thereof.

According to the present invention, a vehicular lamp capable of suppressing a change in a light distribution pattern is provided, a vehicular lamp capable of improving cooling efficiency of a light source is provided, and the vehicular lamp can be used in the field of vehicle headlights such as automobiles.

The invention claimed is:

1. A vehicular lamp comprising:

a substrate;

a light source mounted on a front surface of the substrate;

a projection lens disposed in front of the light source; and a light guidance body having an incident surface on which light from the light source is incident, wherein the light guidance body is disposed between the light source and the projection lens and emits the light toward the projection lens, wherein:

a first space and a second space are provided on a side closer to the light source than to the incident surface, wherein the first space is provided between a first region and the substrate, the first region including, on the incident surface, a part of an outer peripheral edge of the incident surface, and wherein the second space communicates with the first space and is in contact with a second region including, on the incident surface, the other part of the outer peripheral edge of the incident surface; and a width of the second space is wider than a width of the first space in an emission direction of the light from the light source;

the substrate includes a main body part including a region facing the first region of the incident surface, and an extension part facing the second region of the incident surface and being thinner than the main body part; and the second space is provided between the second region of the incident surface and the extension part.

2. The vehicular lamp according to claim 1, wherein the substrate is not disposed on a side opposite to the second region with the second space interposed between the side and the second region.

3. The vehicular lamp according to claim 2, further comprising a heat sink including a base plate disposed on a back surface of the substrate, wherein:

the base plate includes a non-overlapping part that does not overlap the substrate; and the second space is provided between the second region of the incident surface and the non-overlapping part.

4. The vehicular lamp according to claim 1, wherein, when the substrate is viewed from the front, a boundary between the first space and the second space overlaps a recessed part provided in the incident surface.

5. The vehicular lamp according to claim 1, wherein:

the substrate is disposed non-horizontally; and the second space is provided above the first space.

6. The vehicular lamp according to claim 1, further comprising a heat sink including a base plate disposed on a back surface of the substrate and a plurality of heat radiation fins disposed in parallel with an interval therebetween on a surface of the base plate, wherein the surface is located on a side opposite to a side facing the substrate, wherein:

the substrate is made of metal; and the heat sink is provided with a third space in contact with an exposed region, the base plate, and the heat radiation fins adjacent to each other, wherein the exposed region is exposed from the base plate in at least a part of the back surface, wherein the part is located between the heat radiation fins adjacent to each other.

7. The vehicular lamp according to claim 6, wherein the third space merges with the second space.

8. The vehicular lamp according to claim 7, wherein at least a part of the third space overlaps the light source when the substrate is viewed from the front.

9. A vehicular lamp comprising:

a metal substrate;

a light source mounted on a front surface of the substrate; and a heat sink disposed on a back surface of the substrate, wherein the heat sink includes:

a base plate disposed on the back surface; and a plurality of heat radiation fins disposed in parallel with an interval therebetween on a surface of the base plate, wherein the surface is located on a side opposite to a side facing the substrate, and a light guidance body having an incident surface on which light from the light source is incident, wherein the light guidance body is disposed between the light source and the projection lens and emits the light toward the projection lens;

wherein the heat sink is provided with a heat sink side space in contact with an exposed region, the base plate, and the heat radiation fins adjacent to each other, wherein the exposed region is exposed from the base plate in at least a part of the back surface, wherein the part is located between the heat radiation fins adjacent to each other;

a first space and a second space are provided on a side closer to the light source than to the incident surface, wherein the first space is provided between a first region and the substrate, the first region including, on the incident surface, a part of an outer peripheral edge of the incident surface, and wherein the second space communicates with the first space and is in contact with a second region including, on the incident surface, the other part of the outer peripheral edge of the incident surface;

a width of the second space is wider than a width of the first space in an emission direction of the light from the light source;

the substrate includes a main body part including a region facing the first region of the incident surface, and an extension part facing the second region of the incident surface and being thinner than the main body part; and the second space is provided between the second region of the incident surface and the extension part.

10. The vehicular lamp according to claim 9, wherein at least a part of the heat sink side space overlaps the light source when the substrate is viewed from the front.

11. The vehicular lamp according to claim 10, wherein a width of the heat sink side space is wider than a width of the light source when the substrate is viewed from the front.

12. The vehicular lamp according to claim 9, wherein:

the base plate includes a plurality of base plate pieces disposed side by side with an interval therebetween on the back surface;

the heat radiation fin is disposed on each of the base plate pieces adjacent to each other; and the exposed region is exposed between the base plate pieces adjacent to each other.

13. The vehicular lamp according to claim 12, wherein the heat radiation fins, each of which is provided in a corresponding one of the base plate pieces adjacent to each other, are connected to each other.

14. The vehicular lamp according to claim 9, further comprising a light guidance body having an incident surface on which light from the light source is incident, wherein the light guidance body is disposed in front of the light source and guides the light, wherein the heat sink side space overlaps at least a part of the incident surface when the substrate is viewed from the front.

15. The vehicular lamp according to claim 14, wherein:

the base plate includes a non-overlapping part that does not overlap the substrate and an overlapping part that overlaps the substrate; and the heat sink side space extends to an edge of the substrate, wherein the edge overlaps a boundary between the non-overlapping part and the overlapping part when the substrate is viewed from the front.

* * * * *